US012130083B1

(12) United States Patent
Goldberg

(10) Patent No.: US 12,130,083 B1

(45) Date of Patent: Oct. 29, 2024

(54) HEAT PUMP CLOSED LOOP PROCESS DRYING

(71) Applicant: Michael Goldberg, Santa Rosa, CA (US)

(72) Inventor: Michael Goldberg, Santa Rosa, CA (US)

( * ) Notice: Subject to any disclaimer, the term of this patent is extended or adjusted under 35 U.S.C. 154(b) by 0 days.

(21) Appl. No.: 18/641,203

(22) Filed: Apr. 19, 2024

Related U.S. Application Data

(60) Provisional application No. 63/461,158, filed on Apr. 21, 2023.

(51) Int. Cl.
*F26B 25/00* (2006.01)
*F26B 3/04* (2006.01)

(52) U.S. Cl.
CPC .............. *F26B 25/006* (2013.01); *F26B 3/04* (2013.01)

(58) Field of Classification Search
CPC ................................ F26B 15/006; F26B 3/04
USPC ........................................................... 34/417
See application file for complete search history.

(56) References Cited

U.S. PATENT DOCUMENTS

| | | | | |
|---|---|---|---|---|
| 3,922,798 | A * | 12/1975 | McMillan | D06F 58/206 34/131 |
| 4,621,438 | A * | 11/1986 | Lanciaux | D06F 58/06 34/604 |
| 5,361,511 | A * | 11/1994 | Brown | F26B 21/001 34/77 |
| 5,806,204 | A * | 9/1998 | Hoffman | D06F 58/24 34/605 |
| 9,534,329 | B2 * | 1/2017 | Contarini | D06F 29/005 |
| 9,834,882 | B2 * | 12/2017 | Patil | D06F 58/206 |
| 10,179,967 | B2 * | 1/2019 | Ozdemir | D06F 58/206 |
| 10,184,207 | B2 * | 1/2019 | Kim | F28D 21/0014 |
| 10,400,385 | B2 * | 9/2019 | Brown | D06F 58/26 |
| 10,928,131 | B2 * | 2/2021 | Krebs | F26B 23/005 |
| 10,988,894 | B2 * | 4/2021 | Kim | D06F 58/206 |
| 11,242,646 | B2 * | 2/2022 | Welch | D06F 58/00 |
| 11,260,329 | B2 * | 3/2022 | Kim | B01D 46/72 |
| 2005/0066538 | A1 * | 3/2005 | Goldberg | D06F 58/206 34/218 |
| 2006/0179676 | A1 * | 8/2006 | Goldberg | D06F 58/206 68/3 R |

FOREIGN PATENT DOCUMENTS

| | | | | | |
|---|---|---|---|---|---|
| CA | 2540368 | A1 * | 5/2005 | | |
| DE | 4035782 | A1 * | 11/1990 | | |
| KR | 20060083424 | A * | 7/2006 | | |
| KR | 2015117529 | A * | 10/2015 | | F26B 21/00 |
| WO | WO-2005032322 | A2 * | 4/2005 | | D06F 25/00 |

* cited by examiner

*Primary Examiner* — Stephen M Gravini
(74) *Attorney, Agent, or Firm* — Perkins Coie LLP

(57) ABSTRACT

Methods, apparatuses, and systems for a closed loop product drying process are disclosed. Heated dry air enters a drying chamber, extracts moisture from a product to be dried, and exits the drying chamber, cooler and wetter. A heat pump air handler dries and warms the air from the drying chamber exhaust, and returns it to the drying chamber, in a closed air loop. The heat pump air handler includes a dehumidifier means in the closed air loop flow path. The dehumidifier means removes entrained moisture from wet air exiting the drying chamber, reheats the air, and returns it to the drying chamber.

20 Claims, 19 Drawing Sheets

HEAT PUMP CLOSED LOOP PROCESS DRYING

CROSS-REFERENCE TO RELATED APPLICATIONS

This application claims the benefit of U.S. Provisional Patent Application No. 63/461,158, entitled "HEAT PUMP CLOSED LOOP PROCESS DRYING", filed Apr. 21, 2023, which is incorporated by reference herein in its entirety.

TECHNICAL FIELD

The present invention relates to an improved process dryer, such as a spray dryer, for drying a wide variety of products, such as milk or whey, pharmaceuticals, grain, cereals, industrial items such as powder metals, and/or the like.

BACKGROUND

Present day process dryers are variations on the same shared theme, in which substantial quantities of energy are consumed and subsequently vented to the atmosphere. Typical process drying systems heat drying air or drying gas with a natural gas-fired furnace, electric resistance heat, or the like. Said hot drying air passes through a drying chamber once, and after passing through ancillary equipment such as dry product separators, it is vented out of the building.

While some of said drying air extracts moisture from the target product, much of it bypasses the same and escapes without doing any useful work. While this is the simplest and least expensive way to build a process dryer, efficiency, performance, and other improvements are needed.

SUMMARY

Accordingly, it is an object of the present invention to provide a process dryer which has improved performance and efficiency, zero emissions, and low operating temperatures for gentle product handling. The foregoing is attained by the present invention.

In accordance with the present invention, a process drying apparatus broadly comprises a drying chamber, means for supplying heated dry air at a first temperature to the drying chamber, which air supplying means comprise an airflow pathway having means for removing moisture from air exiting said drying chamber by decreasing the temperature of the air to below dew point temperature, and means for increasing the temperature of the air exiting the moisture removing means to the first temperature, and a heat pump system.

The heat pump system comprises means for passing a refrigerant in a vapor state through the temperature increasing means, means for controlling refrigerant mass flow and for converting the refrigerant from the vapor state to a liquid/vapor state, and means for passing the refrigerant in the liquid/vapor state through the moisture removing means to convert the refrigerant into a vapor state.

Other details of the heat pump process dryer of the present invention, as well as other objects and advantages attended thereto, are set forth in the following detailed description and the accompanying drawings.

DETAILED DESCRIPTION

Detailed Description of Prior Art Example

Process dryers are available in a wide variety of types and configurations, such as tunnel dryers, tower dryers, spray dryers, grain dryers, lumber dryers, and the like. For purposes of this specification, a spray dryer is used herein as a process drying example.

Spray Dryers

Spray dryers are available in a variety of styles, with names such as Tall, Wide, Tall Wide, and Bustle; and air flow patterns such as Downdraft, Updraft, Cocurrent, Countercurrent, Mixed Flow, and the like. Said names typically refer to the form factor of the drying chamber, shown as a downdraft chamber 203 in all figures.

Said styles and airflow patterns are variations on the same fundamental theme, in which liquid product is atomized into a mist or fog of very small droplets that is sprayed into a very hot drying gas stream, producing a dry powder product.

Said drying gas is typically air, but can be any suitable gas, such as nitrogen, for certain applications. For simplicity, with the exception of the Alternate Drying Gas section, the term Drying Air is used throughout this specification. The use of drying gas other than air requires a closed loop configuration, discussed in said Alternate Drying Gas section.

Drying chambers are typically large enough to ensure said product droplets are sufficiently dry before reaching the drying chamber surface that they will not stick to same.

The various available form factors and air flow patterns have different drying characteristics, e.g., dry product particle size, agglomeration, etc., and are typically optimized for particular products, such as milk, whey, coffee, baby food, cake mix, and the like.

Spray dryers are available in single stage, two stage, and three stage configurations. For simplicity, the present invention is shown as a single stage downdraft configuration in FIGS. 2-3B, 4B, 9, and 10. It is however compatible with a wide variety of configurations. Examples of common industry configurations are discussed in the Retrofit and Prior Art Considerations section, and shown in FIGS. 1, 4A, 5, 6, 7, and 8.

Figure 1:
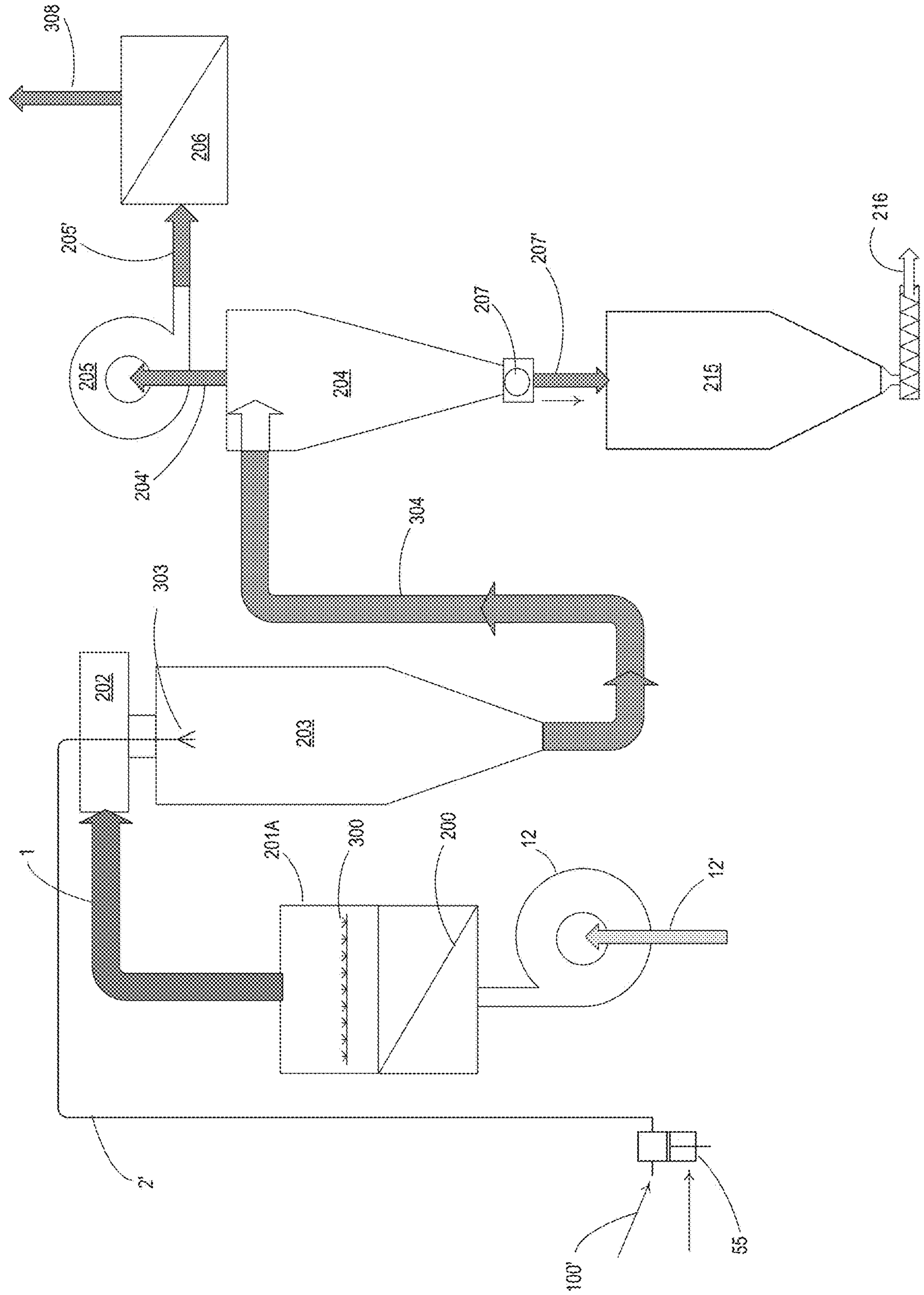
FIG. 1 is a schematic illustration of a typical contemporary dairy spray dryer, in present common use.

FIG. 1 is a schematic illustration of a typical contemporary dairy spray dryer, in present common use. FIG. 1 shows an example of a single stage down draft spray dryer, for producing powdered dairy products such as milk or whey. As shown in FIG. 1, typical spray drying systems draw ambient air 12', via blower 12, through suitable filter means 200, such as a HEPA filter or the like, and pass it through a heating unit, such as furnace 201A, heated by gas burner 300, and discharge it via duct 1, and plenum 202, to primary drying chamber 203.

Hot air supply temperature for dairy spray drying is typically 350° F.~400° F. Furnace 201A in the example of FIG. 1 is direct fired; some systems heat the drying air indirectly with a furnace heat exchanger. Indirect fired heating is mandated in some countries, especially in dairy and food applications, to prevent nitrate and nitrite contamination of the product.

Product to be dried, e.g., milk or whey, enters high pressure feed pump 55, at point 100', which pumps said product feed, typically at 3,500~4,000 PSI in dairy dryers, via high pressure feed line 2', to spray nozzle 303. Product exits spray nozzle 303 as a mist of fine droplets, typically 50~100 micron diameter, with nominal aggregate surface area of 120 $m^2$ per liter of liquid.

Spray nozzles are available in a variety of types for different drying applications, such as high pressure orifice 303 (previously spray nozzle 303), as shown in FIG. 1, rotary disk atomizer, steam swept wheel atomizer, ultrasonic (monodisperse droplets), and two-fluid types. In two-fluid nozzles, low pressure product and moderately high pressure air streams are carried coaxially or in parallel, and merge at or near the nozzle discharge.

Spray nozzle 303 may be a single nozzle, or may comprise a plurality of same, and may be any suitable type known to the industry.

Returning to FIG. 1, hot drying air supplied by the furnace 201A exits plenum 202, and enters drying chamber 203. Product mist, entering said hot air from spray nozzle 303, dries into fine powder, typically in milliseconds. Said powder remains entrained in the drying air, which exits at the bottom of drying chamber 203, and travels to cyclone separator 204, via duct 304.

Cyclone separator 204 functions conventionally; drying air and product powder enter tangentially, causing drying air to rotate, product powder is centrifugally separated, and drops to the bottom. Relatively clean drying air exits at the top via duct 204', traveling to HEPA filter 206, via blower 205 and discharge duct 205'.

Cyclone separator 204, removes the majority of the product powder from its discharge air, but not all of it. A small amount of product powder typically remains in its exit air stream.

To reduce air pollution, an essential function, HEPA filter 206, or an equivalent such as a bag filter, removes powder fines from the airstream, which then exits the facility via roof vent 308.

In practice, especially in dairy applications, a pasteurizer, and an evaporator (e.g., falling film type), typically precede the spray dryer, and the liquid product feed to the spray dryer is typically 45%-55% solids.

Dry product powder exits the bottom of cyclone separator 204 via rotary metering valve 207. Said metering valve 207 is typically a rotating paddle wheel in a close fitting cylindrical housing. The product powder discharge rate may be controlled by varying the rotation speed of said paddle wheel. Metering valve 207 also serves as an air lock to prevent unintended airflow in or out of the system.

Dry product powder exits metering valve 207 at a controlled rate, and enters product storage tank 215. Said dry powder is quite hot as it exits rotary metering valve 207, and is typically cooled before entering tank 215. Product cooling is discussed in the Retrofit and Prior Art Considerations section. It is generally not required in the present invention.

Figure 8:
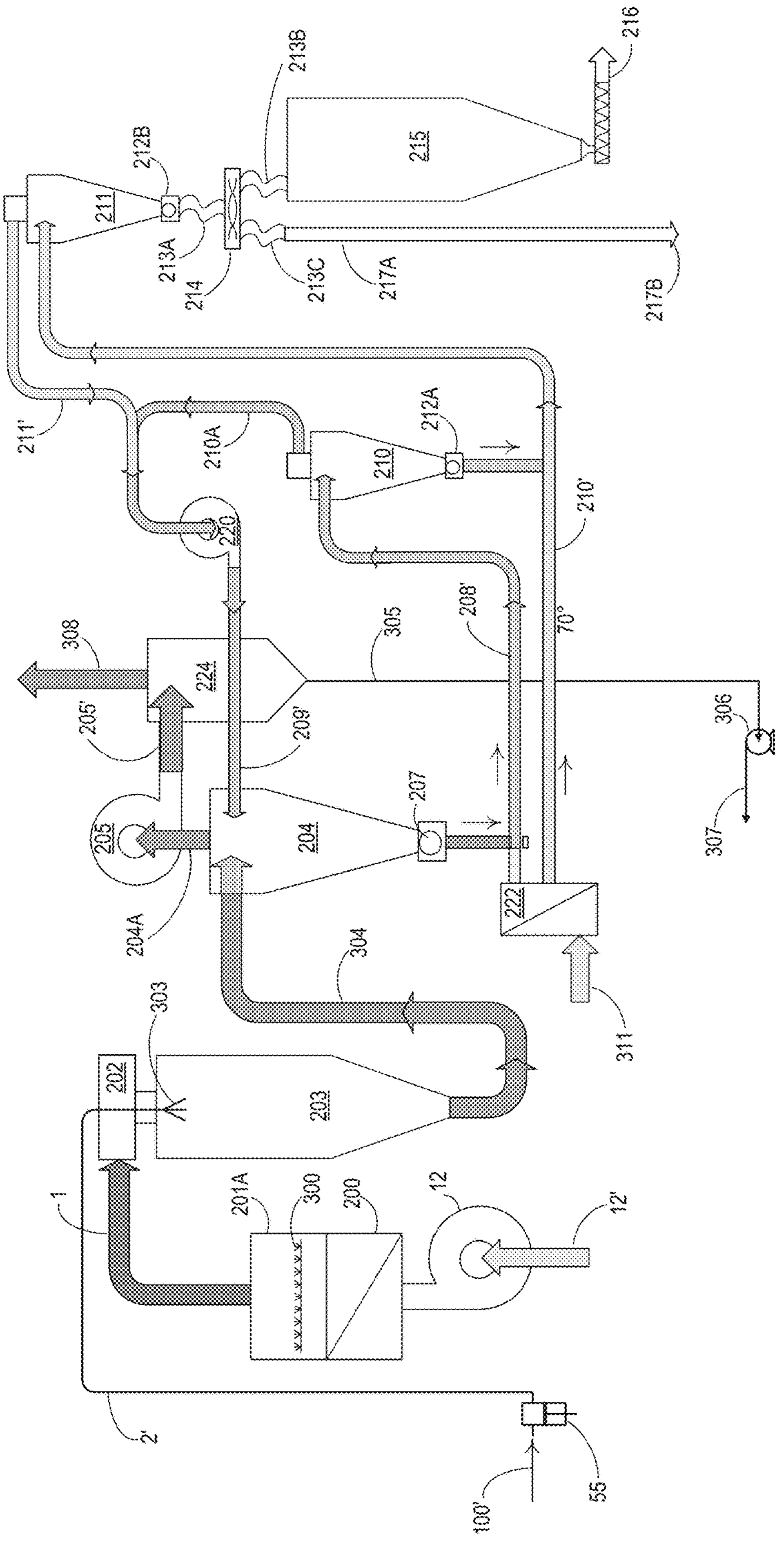
FIG. 8 is a schematic example of a legacy dairy spray dryer, for purposes of illustrating compatibility.

An orbital screener, shown in FIG. 8, is typically included before product tank 215, to trap out agglomerated product particles.

Heat Pump Closed Loop Process Drying Air Circuit

A conventional process dryer that draws ambient air must heat the air to very high temperatures, 350° F.~400° F., to achieve sufficiently low drying air relative humidity (rH). The heat pump closed loop dryer of the present invention can deliver very dry air, on the order of 2% rH, at less than 200° F. (This is discussed further in the Low Temperature Drying Mechanism section of Appendix A, at the end of this document.)

This approach substantially reduces energy consumption. In addition, low temperature drying is materially beneficial to the subject product, especially when food products or pharmaceuticals are being dried, reducing or eliminating heat degradation, preserving flavor, nutrients, efficacy, and the like.

Inside the drying chamber, the basic heat pump process dryer functions similarly to a conventional open loop type. Heated dry air enters the drying chamber, extracts moisture from the product to be dried, and exits the drying chamber, cooler and wetter. The fundamental difference is the way the heat pump dryer provides said heated dry air.

Figure 4A:
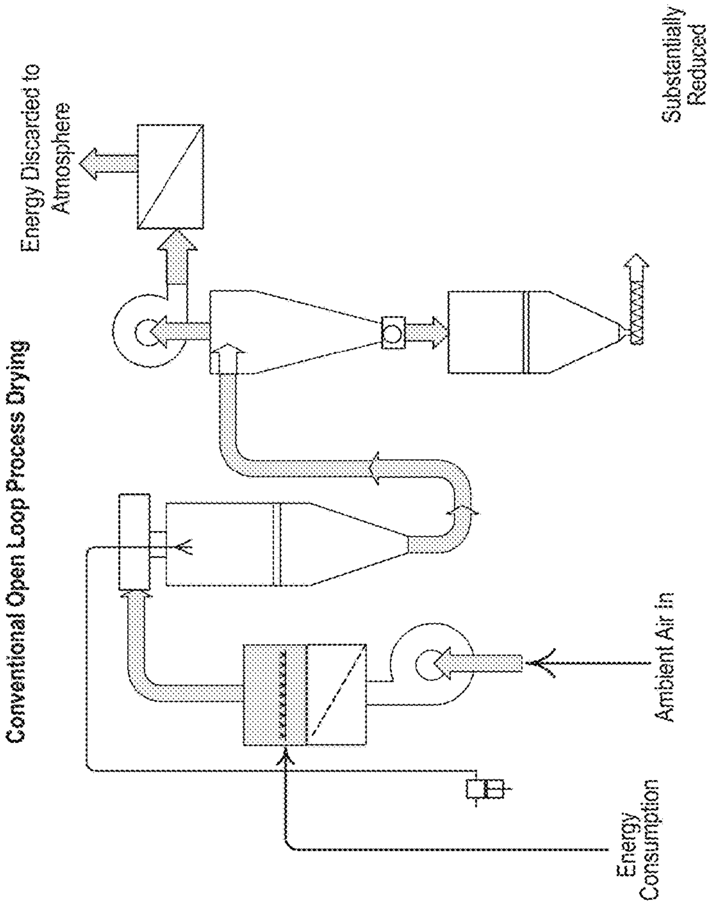
FIGS. 4A and 4B comprise an overview comparison between conventional open loop dryers and the present invention.
Figure 4B:
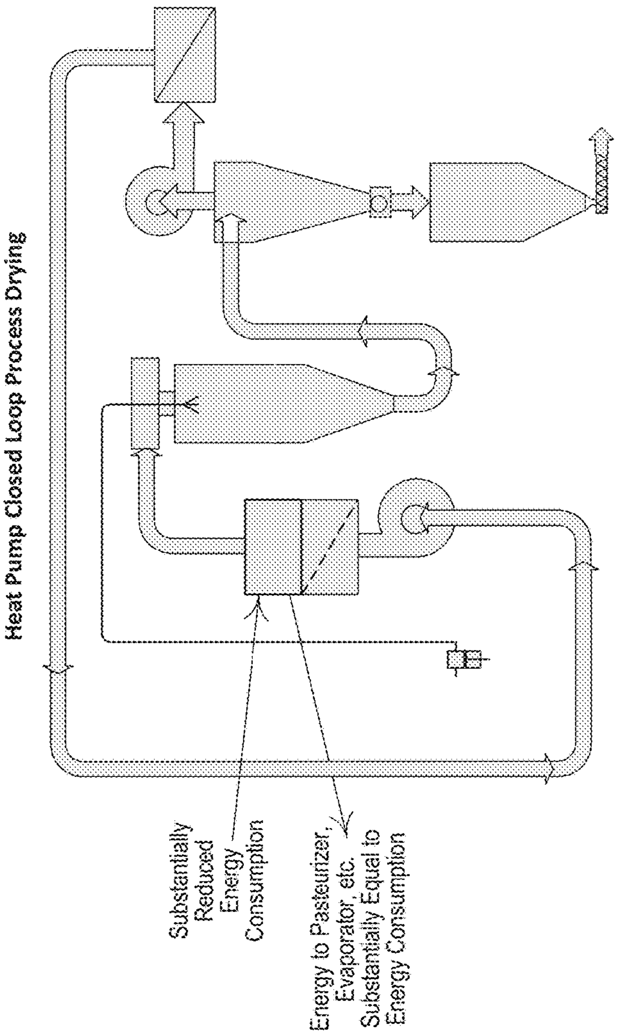

Instead of continually heating incoming ambient air and then externally venting it, as shown in overview FIG. 4A, the heat pump dryer dries and warms the air from the drying chamber exhaust, and returns it to the drying chamber, in a closed loop, as shown in overview FIG. 4B. Heat is retained and does useful work, instead of being wasted.

This is accomplished by connecting the drying chamber exhaust back to its intake, via dehumidifier means. The heat pump dryer uses a closed air loop, with dehumidifier means in the flow path. Said dehumidifier means removes entrained moisture from wet air exiting the drying chamber, reheats this air, and returns it to the drying chamber. The drying chamber may be a vertical downdraft type, as shown in the example figures, or may be of any suitable configuration known to the industry.

Figure 2:
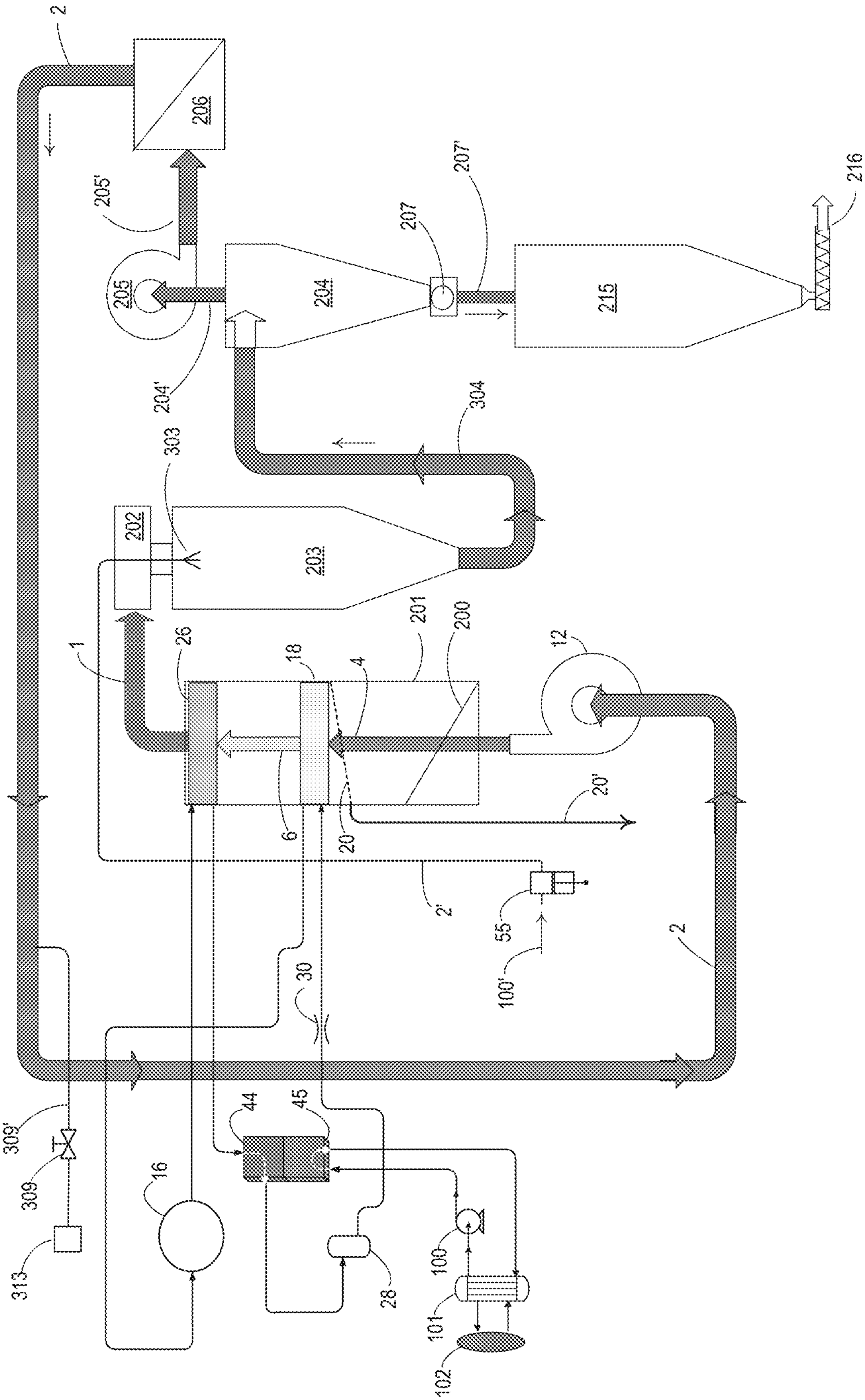
FIG. 2 is a simple schematic example of a first embodiment of the heat pump closed loop spray dryer of the present invention that employs a refrigerant subcooler.

FIG. 2 is a simple schematic example of a first embodiment of the heat pump closed loop spray dryer of the present invention, that employs a refrigerant subcooler. In a first embodiment, similarly to a conventional spray dryer, product to be dried, e.g., milk or whey, enters high pressure feed pump 55, at point 100', which pumps said product feed via high pressure feed line 2', to spray nozzle 303. Product exits spray nozzle 303 as a mist of fine droplets.

Heated dry air enters drying chamber 203, via drying air duct 1 and plenum 202, where it extracts moisture from the atomized liquid product that is exiting spray nozzle 303.

Spray nozzle 303 may be a single nozzle, or may comprise a plurality of same. Each nozzle may be a fixed orifice, a rotating disk atomizer, a steam swept wheel atomizer, an ultrasonic type if monodisperse droplets are desired, or any type commonly known to the industry.

Air then leaves drying chamber 203 via duct 304, laden with entrained powder product and extracted moisture, passes through cyclone separator 204 and HEPA filter 206, and enters main blower 12, which circulates drying air through the drying air loop. Air leaves main blower 12, and passes to heat pump air handler 201.

Inside air handler 201, drying air passes through filter 200, and enters evaporator 18 at point 4. Evaporator 18 extracts sensible heat, sufficient to cool the air to its dew point, and the heat of condensation of water extracted from the product. The required evaporator cooling capacity is thus equal to the sum of the sensible heat and the heat of condensation.

Moisture, previously extracted from the product in drying chamber 203, condenses out of the drying air as it passes through evaporator 18, is collected by drip tray 20, and drains into a suitable drain connection or pump, via tube 20'.

Drying air exits evaporator 18 at point 6, cooled and effectively saturated, and enters condenser 26. Condenser 26 reheats the air to a suitable drying temperature, for example, 160° F.-180° F. Said heated air then exits condenser 26 and air handler 201 at said drying temperature, and at very low humidity, and reenters drying chamber 203, via duct 1, completing the cycle.

The required heating capacity of condenser 26, is substantially equal to said evaporator 18 cooling capacity, comprising said sensible heat and said heat of condensation. Heat substantially equal to the compressor energy consumption is subsequently removed by subcooler 44/45 (discussed in the Refrigerant Subcooler section), maintaining system heat balance.

Air Economizer

Figure 3:
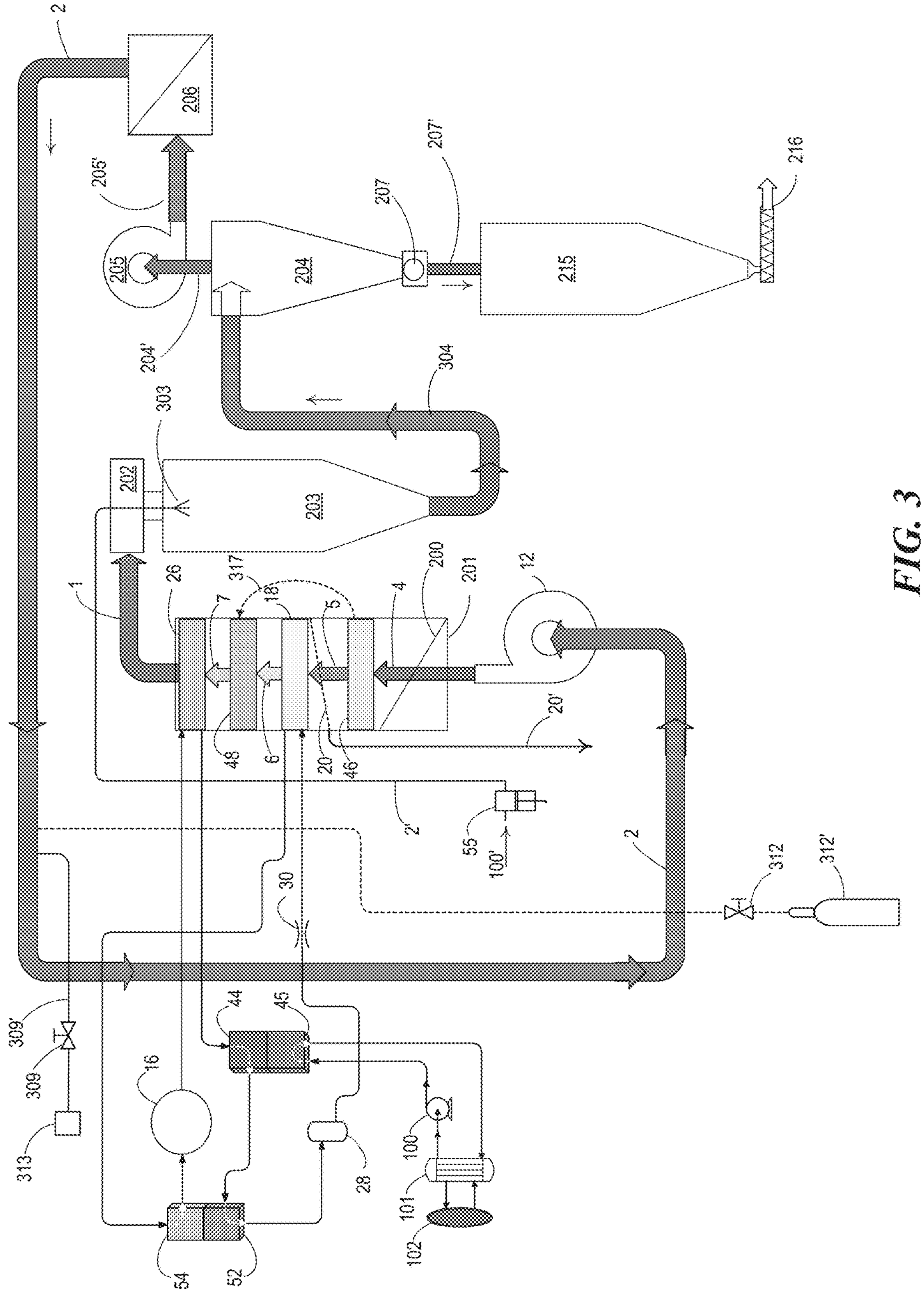
FIG. 3 is a schematic example of a second embodiment of the heat pump closed loop spray dryer of the present invention that employs said refrigerant subcooler, an air economizer, a refrigerant economizer, and external process heat.

FIG. 3 is a schematic example of a second embodiment of the heat pump closed loop spray dryer of the present invention, that employs said refrigerant subcooler, an air economizer 46/48, a refrigerant economizer, and external process heat.

In said second embodiment, said air economizer comprises separate hot and cold heat exchanger sections 46 and 48 respectively, that are thermally connected by heat pipe means, closed loop (e.g., pumped) thermal fluid circulation, or the like. As shown in the example of FIG. 3, said thermal connection 317 is shown as a dashed line extending from air economizer hot section 46 to air economizer cold section 48, and representing heat flow.

In some embodiments, an air economizer 46/48, operates as follows. Wet air exiting blower 12, enters air economizer hot section 46 via filter 200, at point 4. Heat from the wet air is transferred away by air economizer hot section 46, cooling said wet air to its dew point. Said thermal connection 317, regardless of type, transports this heat to cold section 48. Cooled and substantially saturated wet air then exits air economizer hot section 46, and enters evaporator 18 at Point 5.

Air economizer hot section 46 has extracted substantially all of the sensible heat in the wet air, relieving evaporator 18 of said sensible heat burden. As a result, substantially all of evaporator 18 cooling capacity is available for removing heat of evaporation and condensing moisture from the wet air. This may manifest as a smaller evaporator 18, or as increased moisture extraction rate, as desired.

Cooled dry air then leaves evaporator 18, and enters the heat pipe economizer cold section 48 at point 6. Said cold section 48 receives heat extracted from the wet air entering at point 4, via said thermal connection discussed above, and preheats said cooled dry air. Preheated air then leaves heat pipe economizer cold section 48, and enters the condenser 26 at point 7.

Condenser 26 reheats the air to a suitable drying temperature, e.g., 160° F.-180° F., as per previously discussed embodiments. However, the entering air is preheated, and the required condenser 26 heating capacity is substantially reduced. This may manifest as a smaller condenser 26, or as increased drying air heating, as desired.

The required heating capacity of the condenser 26, is then equal to evaporator 18 cooling capacity, comprising only said heat of vaporization. Condenser 26 heating capacity does not include additional evaporator 18 cooling capacity, for pulling the air to its dew point, as none is required.

The heat exchange capacity of the economizer 46/48 manifests as reduced required cooling capacity at the evaporator 18, and reduced required heating capacity at the condenser 26. If the evaporator 18 and condenser 26 are not changed, then the addition of air economizer 46/48 will result in substantially increased drying rate, with no additional energy consumption. If evaporator 18 and condenser 26 are made smaller, then compressor 16 may also be made smaller, and the same drying rate will be realized with reduced energy consumption.

Unitary Air Economizer

Air economizer sections 46 and 48 may alternatively be close coupled, as a unitary air to air heat exchanger (not shown). This approach offers heat exchange effectiveness similar to separate sections as described above. While it is significantly larger and more expensive, it can be advantageous for certain applications and/or venues.

Said separated section embodiments offer substantial manufacturing advantages over unitary embodiments. These advantages include the ability to install the economizer 46/48 in line with evaporator 18, eliminating the need for crossover ductwork and multiple direction changes in the airflow path. The separated section embodiments present reduced air circuit pressure drop, and require substantially less facility space.

Atmospheric Pressure Equalization

As shown in FIG. 3, for applications in which the drying gas is air, bidirectional equalizer vent 309' serves to maintain internal drying circuit pressure substantially equal to ambient atmospheric pressure. Isolation valve 309 may be hand operated, or may be electrically or pneumatically actuated, permitting automatic control of same.

Equalizer vent 309' is attached to duct 2 at a position substantially equidistant from blowers 12 and 205 to minimize blower discharge pressure effects, and at a suitable angle to discourage entrainment of powder fines.

A small filter 313 may be attached to equalizer vent 309', to keep product powder fines from escaping the drying air circuit, and ambient dust, etc., from entering. Flow rate through equalizer vent 309' is very low, and net average flow is effectively zero; in most applications, filter 313 will rarely require attention.

Alternate Drying Gas~Oxygen Free Drying

Referring again to FIG. 3, in some embodiments for applications that require an inert atmosphere, such as flammable products, aseptic applications or oxygen sensitive products such as pharmaceuticals, and applications in which the extracted solvent is not water, such as alcohol or acetone solutions, the complete drying circuit may be purged with a drying gas, such as nitrogen. Tank 312', via valve 312, may be used to store a supply of desired makeup gas. In these embodiments, valve 309 serves as a unidirectional pressure/purge vent.

Together, makeup gas valve 312 and pressure vent valve 309 serve to maintain internal drying loop pressure substantially equal to atmospheric pressure. Valves 309 and 312 may be hand operated, or may be electrically or pneumatically actuated, permitting automatic control of same.

Valve 312 is attached to duct 2 at a position substantially equidistant from blowers 12 and 205 to minimize blower discharge pressure effects, and at a suitable angle to discourage entrainment of powder fines.

In some embodiments, in which a makeup gas supply is connected, and valve 309 is unidirectional, filter 313 may accumulate product powder fines, albeit slowly, and may require occasional attention.

If spray nozzle 303 is a two fluid type, and air may not be used, the atomizing gas may be steam, nitrogen, or the like.

Some embodiments comprise a fully sealed drying gas circuit for applications that require same.

Closed Loop Heat Flow

Small closed loop spray dry systems are available from a plurality of vendors. These systems are typically used for applications that require an aseptic or inert atmosphere, as discussed above, and differ in a number of ways from conventional open loop systems, such as the example shown in FIG. 1.

Figure 5:
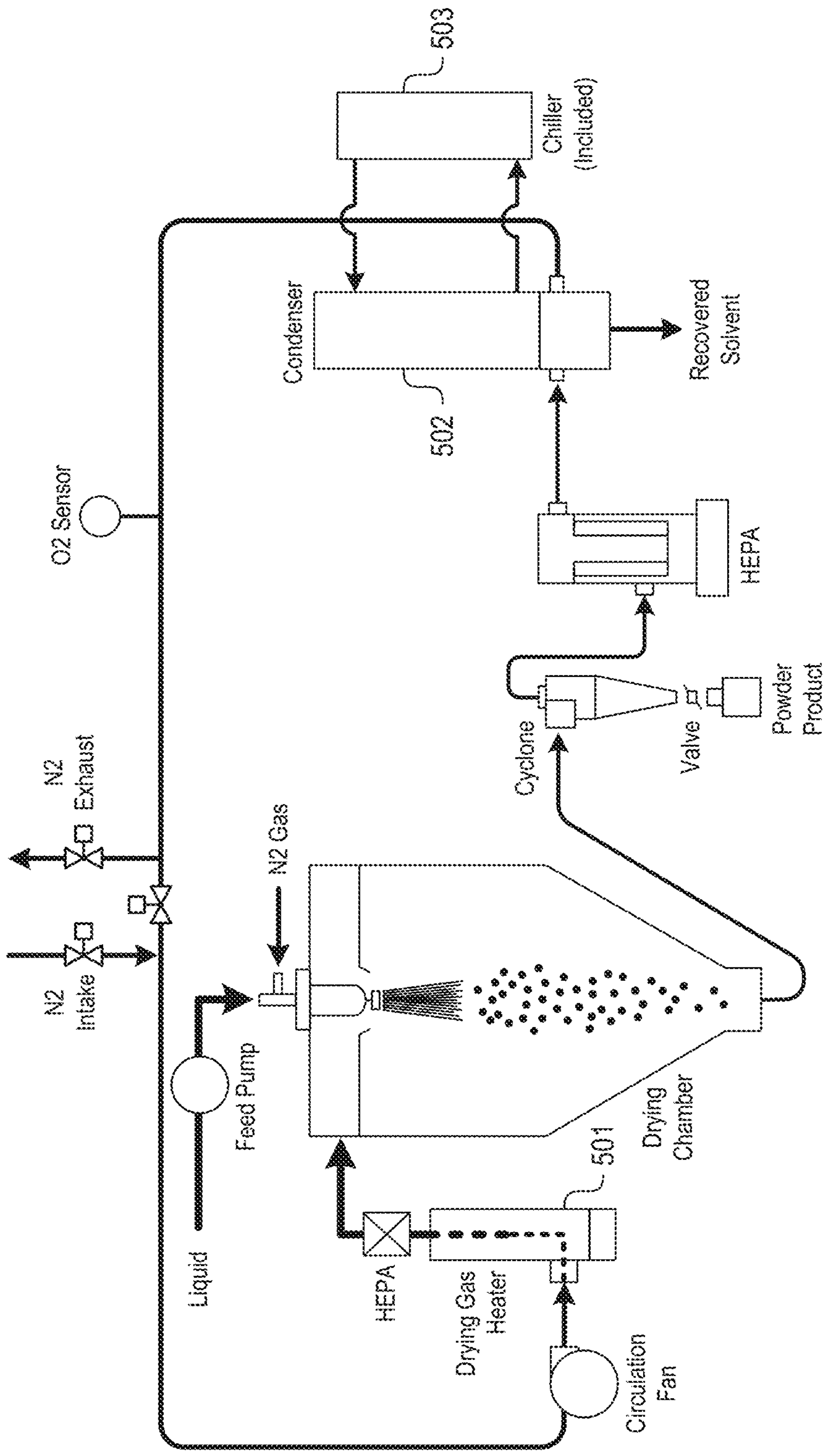
FIG. 5 is a schematic of a commercially available closed loop inert gas spray dryer from manufacturer's literature.

FIG. 5 is a schematic of a commercially available closed loop inert gas spray dryer, from manufacturer's literature. As shown in the example of FIG. 5, these systems also differ markedly from the present invention; they do not employ a heat pump, and they do not close the heat flow loop. Despite comprising a closed loop drying gas circuit, which is often sealed (e.g., for aseptic or solvent extraction systems), they employ a conventional heater 501, such as a natural gas furnace or electric resistance heat.

They discard heat, equal to heater 501 output, to the atmosphere, typically via a large condenser 502 in the drying gas circuit. Condenser 502 is often accompanied by a chiller 503, which consumes additional energy, and typically discards same to the atmosphere as well.

These systems effectively comprise two circuits, a closed loop drying gas circuit, and an open loop heat flow circuit. The heat output of condenser 502 is equal to process (drying) gas heater 501 (also referred to as heater 501) energy consumption. Chiller 503 output is equal to said heater energy consumption plus chiller 503 internal energy consumption. System energy consumption is then nominally equal to process gas heater 501 energy consumption plus chiller 503 energy consumption. Limited attempt is made to retain or recover process heat, or to mitigate process energy consumption.

The heat pump process dryer of the present invention advantageously employs a heat pump, comprises closed loop drying gas flow and closed loop heat flow, consumes materially less energy than conventional closed loop systems, and provides useful heat to external processes, typically presenting zero net energy consumption.

Heat Pump Refrigerant Circuit

Referring again to FIG. 3, the system heat pump operates as a dehumidifier, as follows: refrigerant exits compressor 16 as high pressure vapor, and passes to condenser 26, where heat of condensation of the refrigerant is transferred to the drying air.

The refrigerant condenses, exits condenser 26 as a high pressure liquid, and passes through subcooler hot side 44, optional refrigerant economizer hot side 52 (discussed respectively in the Refrigerant Subcooler and Refrigerant Economizer sections), and receiver 28, to thermal expansion valve (TEV) 30, which reduces the refrigerant pressure. The refrigerant exits TEV 30 as a low temperature, low pressure, low quality (high liquid content) liquid/vapor mixture, and enters evaporator 18.

Evaporator 18 extracts heat of vaporization of the refrigerant from the drying air, and boils the refrigerant to the vapor state. Slightly superheated refrigerant vapor exits evaporator 18, passes through optional refrigerant economizer cold side 54 and reenters compressor 16, completing the cycle.

TEV 30 controls the refrigerant mass flow by proportionally opening and closing in response to system conditions. In some embodiments, TEV 30 maintains constant low superheat, to maximize evaporator capacity while preventing liquid from entering the compressor.

A control system (not shown) comprises a computer, microprocessor based controller, PLC, and/or the like. Said control system is coupled to various dryer components via electrical, electronic, or pneumatic control lines (not shown) for controlling respective operations.

Said control system receives input from system sensors and user input/output devices. Said sensors include, for example, temperature and/or humidity sensors positioned at various locations along the drying air circuit, and temperature and/or pressure sensors along the refrigerant circuit.

A plurality of control and TEV embodiments are discussed in the System Controls section of this document.

Refrigerant Subcooler

Any closed system must follow the first law of thermodynamics; energy output must equal energy input. In a heat pump closed loop dryer, heat substantially equal to energy consumption must be removed to maintain energy balance.

As shown in FIG. 3, the refrigerant subcooler 44/45 accomplishes this, as follows:

In some embodiments, refrigerant exits condenser 26, passes through refrigerant subcooler hot side 44, and optionally passes through refrigerant economizer hot section 52, enroute to receiver 28. Subcooler 44/45 removes heat substantially equal to compressor 16 energy consumption, maintaining system energy balance.

Refrigerant exits subcooler hot side 44, optionally passes through refrigerant economizer hot side 52, and passes through receiver 28 to TEV 30. TEV 30 reduces the refrigerant pressure, as discussed in the Heat Pump Refrigerant Circuit section. However, subcooler 44/45 has removed substantial heat from the refrigerant, and it enters TEV 30 at significantly lower enthalpy. Refrigerant exiting TEV 30 and entering evaporator 18 is of much lower quality (more liquid, less gas) when subcooler 44/45 is used. This materially improves the cooling capacity of evaporator 18.

Absent subcooler 44/45, condenser 26 capacity is equal to evaporator 18 capacity plus compressor 16 energy consumption. However, since compressor 16 input energy is removed by the subcooler 44/45, energy balance dictates that condenser 26 capacity need only equal evaporator 18 capacity.

Saturation temperatures are reduced when the subcooler is active; evaporator capacity and moisture extraction rate increase, and condenser capacity drops until equilibrium is reached, as discussed below.

As saturation temperatures in the system are reduced, when subcooler 44/45 is active, either refrigerant mass flow or evaporator 18 superheat will change accordingly. This is dependent on TEV 30 behavior.

If TEV 30 is configured to maintain constant evaporator 18 superheat, it will increase refrigerant mass flow as needed when subcooler 44/45 is present. This will commensurately increase heat pump capacity and drying rate, provided drying circuit airflow is sufficient.

If TEV 30 is configured to allow evaporator 18 superheat to float, said superheat will increase when subcooler 44/45 is present. This may be advantageous in some embodiments, as discussed in the Refrigerant Economizer section of this document.

When the subcooler 44/45 is used, increased refrigerant superheat at the compressor suction causes increased superheat in the refrigerant exiting compressor 16. This in turn reduces the condenser 26 effectiveness, commensurate with the reduced condenser 26 capacity required when subcooler 44/45 is present.

The subcooler hot side 44 is configured as an air cooled (e.g., fin tube; not shown) heat exchanger. In some air cooled embodiments, subcooler cold side 45 is not used, and suitable fan or blower means are included to deliver ambient air to the subcooler 44 air side.

Said air cooled subcooler is enclosed in an insulated housing that substantially restricts heat transfer and natural convective airflow when said fan or blower means are not operating. Said housing thus facilitates accurate subcooler 44 effectiveness control via cooling airflow control, such as controlling fan or blower speed.

In some embodiments, subcooler 44/45 is liquid cooled. Subcooler 44 cold side is then used to supply process heat, e.g., evaporator preheat, feedstock preheat, clean-in-place (CIP) preheat, and/or space heat, to other sections of the facility. An example of this is shown in FIG. 3, in which pump 100, circulates a suitable heat exchange fluid such as a glycol solution, in an independent loop comprising subcooler cold side 45 and intermediate heat exchanger 101. Intermediate heat exchanger 101 is then used to directly or indirectly heat one or more external processes 102. The dryer net energy consumption is then effectively zero.

As shown in FIG. 3, in a first embodiment of said external process heat supply, pump 100 circulates a suitable thermal fluid, such as a glycol solution or the like, around the circuit comprising subcooler cold side 45 and intermediate heat exchanger 101. Intermediate heat exchanger 101 in this example is a liquid to liquid type, e.g., shell and tube, brazed plate, or the like, or may alternatively be a liquid to air type, e.g., fin tube. Intermediate heat exchanger 101 may be at or near subcooler cold side 45, or may be at or near said external processes.

A secondary thermal fluid circuit, also comprising a glycol solution or the like, may transport heat from intermediate heat exchanger 101 to said external processes 102. Said secondary thermal fluid may be circulated by a separate pump (not shown) which may be located anywhere along said secondary thermal fluid circuit, as desired.

Intermediate heat exchanger 101 serves to isolate any external processes from subcooler cold side 45. If this isolation is not necessary, intermediate heat exchanger 101 need not be used, and thermal fluid may be circulated by pump 100, directly between said external processes and subcooler cold side 45. In this configuration, pump 100 may be located anywhere along the subcooler cold side 45 thermal fluid circuit, as desired. Said thermal fluid circuit or circuits may include thermal storage and/or controls as desired, to ensure stable heat supply to target external process or processes.

In all of the above liquid cooled subcooler embodiments, the dryer net energy consumption is effectively zero.

Alternative to Refrigerant Subcooler~Wet Air Heat Exchanger

Figure 2A:
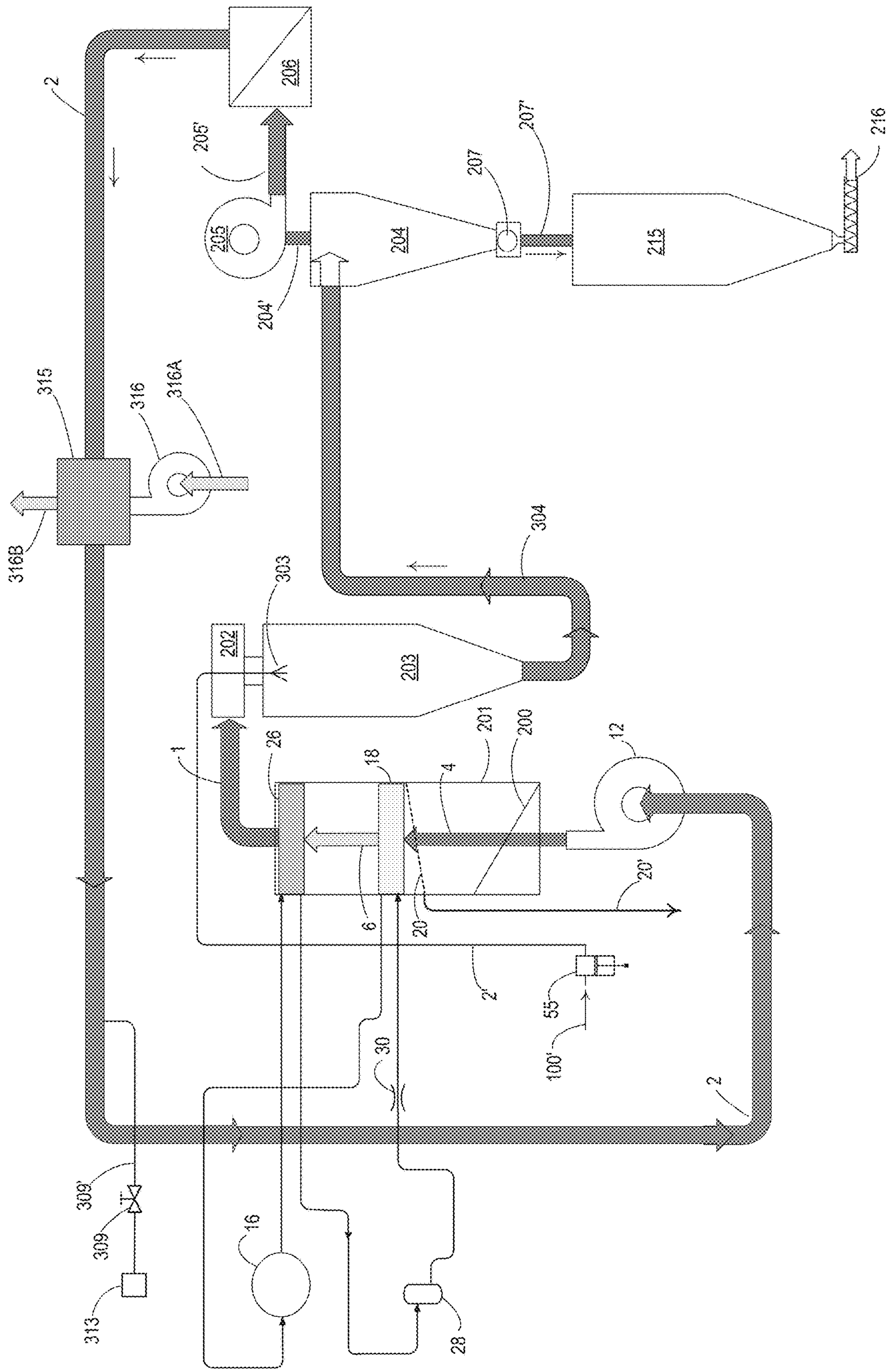
FIG. 2A is a schematic example of a third embodiment of the heat pump closed loop spray dryer of the present invention that employs a wet air heatsink in lieu of a refrigerant subcooler.

FIG. 2A is a schematic example of a third embodiment of the heat pump closed loop spray dryer of the present invention, that employs a wet air heatsink 315 (also referred to as wet air heat exchanger 315) in lieu of a refrigerant subcooler 44/45. Said wet air heat exchanger can serve the same function as subcooler 44/45, removing heat equivalent to compressor 16 energy consumption, by removing said heat directly from the drying air, rather than from the refrigerant circuit.

In some embodiments, e.g., the embodiments shown in FIG. 2A, drying air passes through wet air heat exchanger 315 hot side, after performing useful work in drying chamber 203. Ambient air enters blower 316 at point 316A, passes through wet air heat exchanger 315 cold side, extracting heat substantially equal to compressor 16 energy consumption from drying air in duct 2, and exiting wet air heat exchanger 315 at point 316B. Wet air heat exchanger 315 is shown as an air cooled device in FIG. 2A, but may be water cooled (not shown) if desired.

Figure 2B:
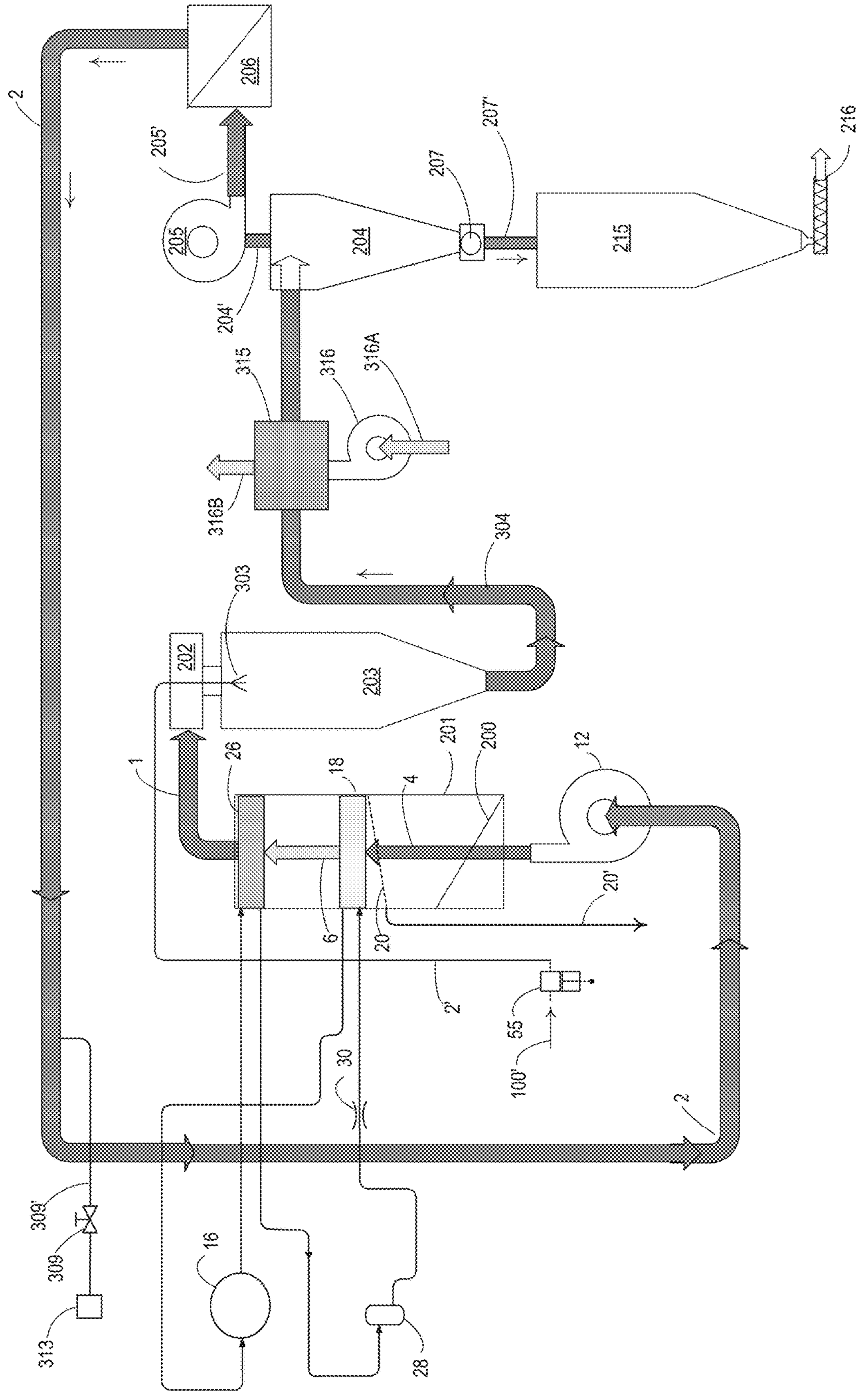
FIG. 2B shows an alternate location for said wet air heatsink.

Wet air heat exchanger 315 may alternatively be located between main drying chamber 203 and cyclone separator 204, as shown in FIG. 2B. These embodiments cool the dried product as well as the drying air. Although product cooling is typically not required in the present invention, these embodiments may be advantageous in some applications.

A wet air heat exchanger can be advantageous for certain venues. It is however significantly larger and more expensive than subcooler 44/45, and the available temperature difference between the drying air and the ambient cooling air is fairly small. This small heat exchange approach can cause effectiveness issues if the available cooling air is too warm. Additionally, its relatively low operating temperature may compromise the ability to use said extracted heat for external processes.

Large Systems

In said first and second embodiments, as shown in the example figures, refrigerant passes directly through condenser 26 and evaporator 18. In large systems, this approach can be impractical for several reasons, such as very long refrigerant lines, very large refrigerant volume, and the like.

For large systems, in some heat pump embodiments (not shown) the entire heat pump assembly can be a unitary module, with liquid coupled evaporator and condenser, e.g., shell and tube or brazed plate type. Said condenser and evaporator may then be liquid coupled, with a glycol solution or any suitable heat transfer fluid, to heat exchangers in heat pump air handler 201, that serve the purposes of condenser 26 and evaporator 18, respectively.

A plurality of said unitary modular heat pumps may be coupled in parallel, to heat exchangers 26 and 18 in air handler 201, to provide the desired total heat pump capacity for the process dryer.

Alternatively, condenser 26 and evaporator 18 may each comprise a plurality of separate heat exchangers or heat exchanger sections, with each heat said exchanger or section liquid coupled to a separate respective unitary modular heat pump, via separate thermal fluid loops.

Said unitary modular heat pump or heat pumps may be located remotely from the dryer, e.g., at another section or floor of the facility, if desired.

Heat Pump Closed Loop Process Drying, Additional Benefits

Continuous Duty Operation

It is common practice to run large industrial process dryers continuously, employing multiple shifts per day. The heat pump closed loop process dryer of the present invention is well suited to this practice, and may be run continuously if desired, stopping only for legally mandated CIP requirements, occasional routine maintenance, and the like.

Very High Efficiency

The heat pump closed loop dryer of the present invention consumes nominally half the energy of conventional types, and provides useful distributable heat for external processes. In most applications, net energy consumption is zero.

Low Temperature Drying

The heat pump closed loop dryer of the present invention effectively delivers extremely dry drying gas with no need for high temperatures, and can dry product at substantially lower temperatures than conventional systems. Low temperature drying reduces or eliminates product heat degradation, with equal or better performance. Expansion, ballooning, and/or fracturing of the dry product particles due to hot air infiltration are materially mitigated or eliminated. Nutritional and flavor aspects of dairy and food products are substantially preserved.

Zero Emissions

Process dryers, such as spray dryers, typically produce a powder product, e.g., powdered milk. Such dryers employ one or more separators, typically of the cyclone type, to remove powder product from the drying air before it is vented to the atmosphere.

However, said separators typically do not remove all of the powder, especially powder fines, which are discharged into the atmosphere with the drying air. Powder fines are a significant air pollutant. Process dryer operators are subject to strict regulations and inspections, and often incur significant expense related to same. As the dryer of the present invention comprises a closed loop, and does not vent drying air, it produces zero atmospheric emissions.

Intrinsically Safe

Fire is an ever present hazard in powder handling equipment. The present invention uses no fire or flame, and presents no ignition sources. The highest temperature anywhere in the drying air circuit is less than 200° F.

Nitrate and Nitrite formation in the drying air does not occur. As there is no furnace, the question of expensive indirect types does not apply.

Performance and Efficiency Features, Detailed Discussion

Refrigerant Economizer

Additional operating efficiency may be realized with a refrigerant economizer 52/54, as shown in FIG. 3. The refrigerant economizer (RE) comprises a hot side 52 and a cold side 54. In some embodiments, a brazed plate type heat exchanger, or any suitable refrigerant grade heat exchanger, such as coaxial tube, or the like, are used.

Referring to FIG. 3, refrigerant economizer 52/54 operates as follows: Refrigerant exits the subcooler hot side 44 and enters the hot side of RE 52. The RE hot side 52, transfers heat away from the refrigerant to its cold side 54. The refrigerant then exits RE hot side 52, and passes through receiver 28 to TEV 30.

TEV 30 reduces the refrigerant pressure as in previously discussed embodiments. However, when RE 52/54 is present, the enthalpy of the refrigerant entering TEV 30 is reduced, and exits TEV 30 as a lower quality mixture (more liquid, less gas) than when RE 52/54 is not used. This increases the effective capacity of the evaporator, 18. This benefit may manifest as a smaller (reduced capacity) evaporator, or as increased moisture condensing rate, as desired.

In some embodiments, RE 52/54 is used in conjunction with subcooler 44/45. In this configuration, heat is sequentially removed from the refrigerant in both the subcooler 44/45, and RE 52/54, reducing the enthalpy of the refrigerant entering TEV 30 further than with either component alone.

Refrigerant enters evaporator, 18 at reduced enthalpy, where it extracts heat of vaporization from the wet drying air. The refrigerant then exits evaporator 18 as slightly superheated vapor, and enters RE cold section 54. In RE cold section, 54, the refrigerant absorbs heat conducted from the liquid refrigerant in the RE hot section 52, and exits RE cold side 54 as very superheated vapor, with typical superheat on the order of 100° F.

Said very high superheat substantially increases the refrigerant density at compressor 16 suction. If compressor 16 is a constant displacement type, the increased refrigerant density at said suction results in increased refrigerant mass flow. The high temperature at compressor 16 suction also improves compressor 16 isentropic efficiency.

When refrigerant economizer 52/54 is present, refrigerant mass flow increase is typically on the order of 20%. This may manifest as increased heat pump capacity and concurrent increased drying rate, or alternatively, a lower displacement compressor may be used with RE 52/54, with no performance degradation.

The high superheat delivered by RE 52/54 permits novel control methods. It is not necessary to maintain a margin of superheat at the evaporator 18 discharge, because with RE 52/54 in use there is no risk of liquid refrigerant entering the compressor. An alternate control algorithm that maintains constant temperature of the air exiting evaporator 18 may be used, as discussed in the System Controls section of this document.

Alternate Refrigerant Economizer Configuration

Figure 3A:
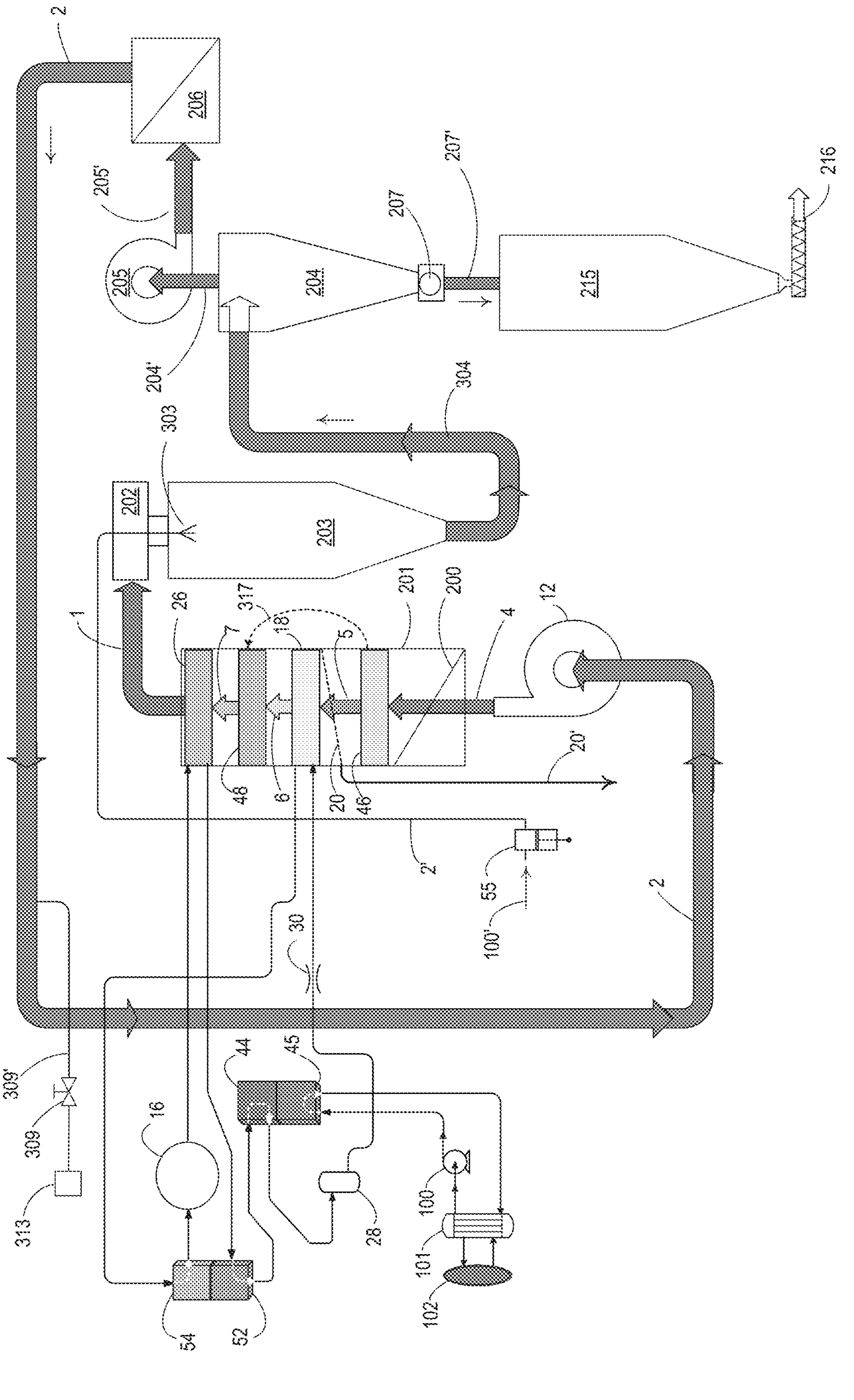
FIG. 3A is a schematic example of a fifth embodiment of the heat pump closed loop spray dryer of the present invention that employs an alternate refrigerant economizer location.

FIG. 3A is a schematic example of a fifth embodiment of the heat pump closed loop spray dryer of the present invention, that employs an alternate refrigerant economizer location. In some embodiments, as shown in FIG. 3A the relative locations of subcooler hot side 44, and refrigerant economizer hot side 52, are interchanged. This can be advantageous if said subcooler is liquid cooled.

One advantage of a liquid cooled subcooler is the ability to extract more heat than an air cooled type, especially in hot ambient conditions. However, in said second embodiment, shown in FIG. 3, the temperature of refrigerant exiting liquid cooled subcooler hot side 44 can be low enough to compromise useful heat extraction by refrigerant economizer 52.

In some embodiments, for example the embodiments shown in FIG. 3A, this limitation is eliminated; refrigerant economizer hot side 52 receives refrigerant directly from condenser 26, which is sufficiently hot to permit good refrigerant economizer 52/54 performance; and water cooled subcooler 44/45 has sufficient approach to permit good performance with refrigerant exiting refrigerant economizer hot side 52.

Compressor Desuperheater

A compressor desuperheater (not shown), comprising a suitable heat exchanger between compressor 16 discharge and suction, may be used to further increase refrigerant mass flow for a given compressor. The increased mass flow may be used toward increased drying rate, or a smaller compressor may be used with no loss in performance.

System Controls

Some embodiments include a control system (not shown), such as electronic or substantially electronic, that serves several functions. Among its useful functions, control system embodiments perform facility startup sequentially, such as establishing proper drying airflow before starting compressor 16.

Some control system embodiments also soft start all significant loads, such as blower 12, compressor 16, and/or the like, to further reduce electrical surge current and demand load.

In some sequences, in some embodiments, the control system first starts blowers 12 and 205 sequentially, and then starts compressor 16 when drying air reaches the desired flow rate. Compressor 16 may start after a suitable fixed time delay, or may start when a suitable sensor indicates sufficient drying airflow.

Additional functionality of said control system may include heat pump capacity control, temperature control, flow controls, humidity control, safety limits, function selection, CIP control, and/or the like; and importantly, product dryness control.

Product Dryness Control

In some embodiments (not shown) said control system monitors product dryness and adjusts operational parameters, such as compressor speed, airflow rate, and/or the like, preferably in real time, to maintain said dryness at a consistent desired level.

For example, in some embodiments, the absolute humidity (mixing ratio) of drying air exiting the drying chamber is monitored. When the absolute humidity of air exiting the drying chamber is within a desired tolerance, e.g., 5 grains of water per kilogram of dry air, the control algorithm is satisfied.

In some embodiments, the difference between the absolute humidity of air entering and exiting the drying chamber is monitored, again seeking a target value, e.g., 5 grains of water per kilogram of dry air, for better product dryness accuracy.

If said absolute humidity deviates from the target set point, the control algorithm adjusts appropriate parameter(s) automatically to bring product dryness to target range. Said adjustment parameters may include slightly increasing heat pump capacity if product moisture content is too high, or reducing same if product moisture content is too low.

Heat pump capacity may be controlled by modulating compressor (16) speed, and/or by adjusting additional parameters as desired, such as blower (12 and/or 205) speed and/or the effectiveness of subcooler 44/45.

Other parameters such as temperature may be factored into the dryness control algorithm, and other sensors, continuous or batch type, such as weight, optical, ultrasonic, particle size, FTIR, and/or the like may be used.

Said control system includes a suitable user interface, such as a touch screen or the like, for entering control commands, desired product dryness and other parameters, and for displaying said parameters and system status. Said user interface may also be used for displaying appropriate system alarms, such as overdry, overdamp, compressor high side overpressure, or the like as needed.

Temperature Control

It is desirable to maintain relatively constant operating temperature during drying. In some embodiments, evaporator 18 saturation temperature is kept as low as practical without causing frost or ice accumulation. The dryer temperature may be controlled by a variety of methods, as desired, such as modulating the effectiveness of subcooler 44/45 or the like.

It is desirable to accomplish temperature control with as little hysteresis as practical, particularly when subcooler 44/45, and refrigerant economizer 52/54 are both present.

Refrigerant economizer 52/54 transfers more heat when subcooler 44/45 is cut off. When subcooler 44/45 is switched on or off, e.g., by controlling cooling fluid flow through subcooler cold side 45, TEV 30 typically requires 15~30 seconds to equalize; an inefficient transitional state.

This transitional state can also cause undesirable product dryness fluctuations. While on/off type control can be functionally implemented, proportional control is thus advantageous and preferable over on/off control for all embodiments.

Subcooler Effectiveness Control

In embodiments using subcooler 44/45, effectiveness modulation (for example to control dryer operating temperature) may be accomplished with diverter valve means that switch the subcooler in or out of the refrigerant circuit, as desired.

As discussed in the Temperature Control section above, some embodiments advantageously modulate subcooler effectiveness proportionately, without the hysteresis introduced by on/off cycling, by varying the flow rate and/or the inlet temperature of the thermal solution flowing through subcooler cold side 45.

This is accompanied by suitable thermal storage means and temperature control in the subcooler cold side 45 cooling circuit, and/or thermal fluid flow rate control through same, to ensure constant temperature in any external processes that are heated by same, while also maintaining accurate control of dryer temperature.

If during dryer operation, minor fluctuations cause subcooler available heat to exceed external process needs, said excess heat may be stored in said thermal storage means. Although it is preferable to use all of the heat released by subcooler 44/45, in one or more external processes, if heat released by subcooler 44/45 exceeds thermal storage capacity, said excess heat can be vented to the atmosphere as needed, e.g., via an external heat exchanger. Some embodiments do not require said atmospheric excess heat release.

Alternatively, for an air cooled subcooler, the subcooler fan may be cycled as needed to modulate the subcooler. In some embodiments, proportional air cooled subcooler modulation may be accomplished with variable fan speed, which achieves said modulation absent the hysteresis introduced by on/off cycling.

In some fan controlled embodiments, subcooler 44/45 may be enclosed in an insulated housing that substantially restricts heat transfer and natural convective airflow when the fan or blower is not operating, thus facilitating accurate control of subcooler 44/45 effectiveness with variable cooling airflow means.

Thermal Expansion Valve

Thermal expansion valve (TEV) 30 may be configured to maintain constant or near constant superheat at the evaporator discharge. This may be accomplished with a simple mechanical TEV of the capillary tube and sensing bulb type, or with a suitable electronically controllable type, under proportional or proportional integral derivative (PID) control.

In some embodiments, TEV 30 may be configured to ignore evaporator superheat, and seek to maintain constant air temperature exiting the evaporator. This is the most direct method of maintaining evaporator air temperature as low as practical without freezing. In this latter approach, evaporator superheat may in practice approach zero (saturated vapor). This will not compromise performance or introduce risk of liquid entering the compressor, if it is used with refrigerant economizer 52/54.

Refrigerant economizer 52/54 introduces substantial superheat at the compressor suction, and saturated vapor at the evaporator discharge will have no undesirable effect.

Although not ideal for large embodiments typical of process drying facilities, a constant pressure valve, capillary tube, or other suitable simple expansion means may be used in place of TEV 30 if desired.

Refrigerant receiver 28 is preferably present, offering modest performance improvement and stability, but it is not essential and may be eliminated if desired.

Additional Process Enhancements

Active Expander

Figure 3B:
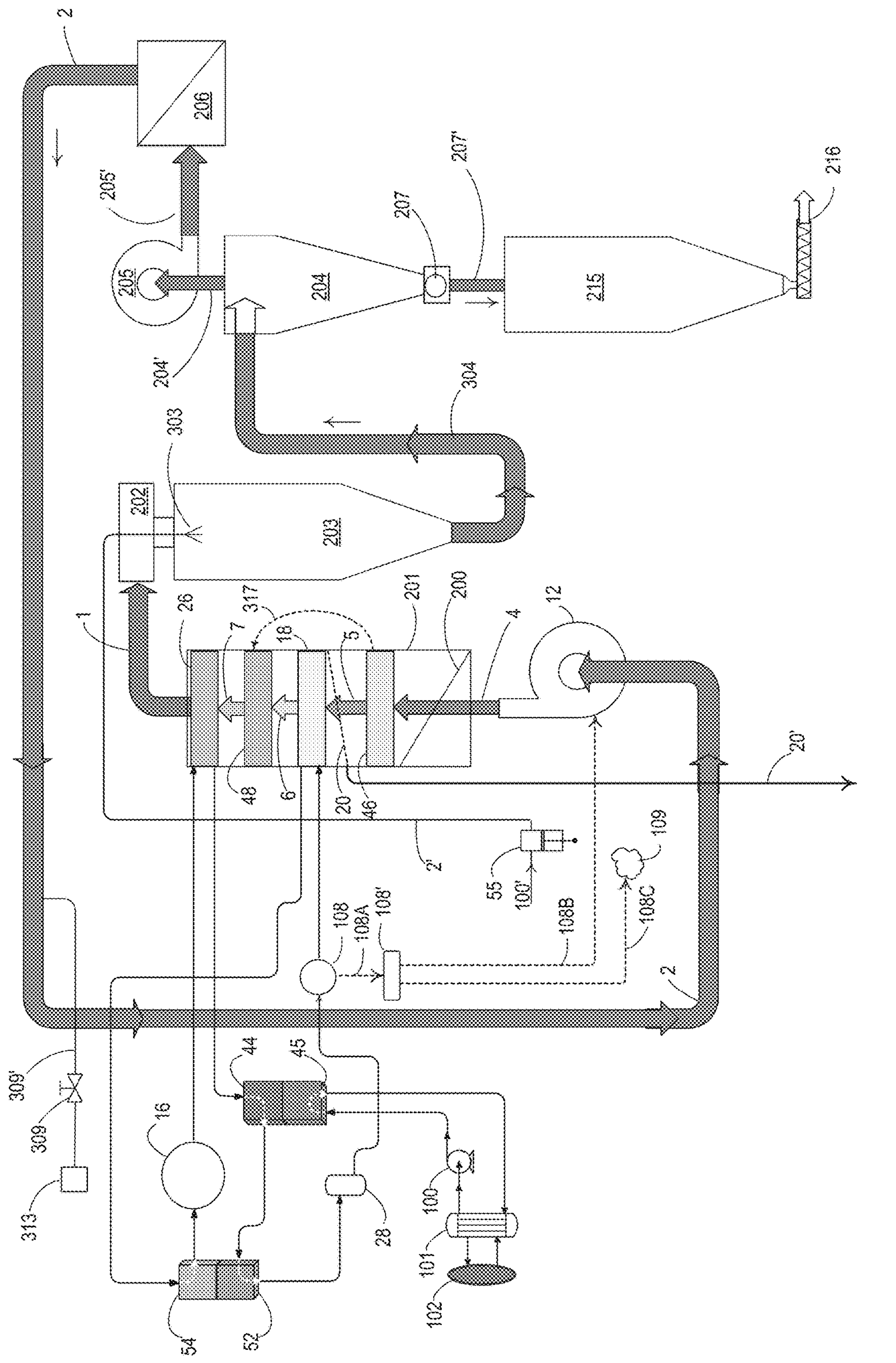
FIG. 3B is a schematic example of a fourth embodiment of the heat pump closed loop spray dryer of the present invention that employs an active expander in lieu of a thermal expansion valve.

FIG. 3B is a schematic example of a fourth embodiment of the heat pump closed loop spray dryer of the present invention, that employs an active expander in lieu of a thermal expansion valve. To improve heat pump efficiency and further reduce drying energy consumption, in some embodiments, an active expander 108 is employed in place of TEV 30. Expander 108 serves the same function as a TEV, but instead of using irreversible friction as the source of pressure drop, it reversibly extracts useful energy from the refrigerant. While any suitable expander, such as a rotary vane, gear, centrifugal, or turbine type, will suffice, some embodiments employ a scroll type refrigerant compressor operating in reverse as an expander, and generating useful mechanical output or electricity.

With minor modifications, e.g., removal of the discharge check valve if present, a scroll type expander becomes a very efficient expander, and will advantageously tolerate low quality inlet vapor and internal vaporization of liquid refrigerant during expansion. This embodiment produces electrical output, and comprises hermetic construction, preserving the hermetic nature of the refrigerant circuit and its commensurate design life and reliability.

The electrical output from expander 108 is sent via power line 108A to electronic power conditioner 108' that provides regulated voltage DC power, or regulated voltage and frequency sine wave power, as desired, over a useful range of expander 108 rotation speeds.

The resultant clean electrical supply may be used to operate dryer components, such as blowers 12 and/or 205, e.g., via power line 108B, or may supply power via power line 108C to ancillary equipment 109, as desired. Said electrical output may supply part or all of the required power for said ancillary device or devices, respectively reducing or eliminating their mains power consumption. Power conditioner 108' may be any suitable commercially available inverter based type, or the like.

For common commercial heat pump applications employing unitary devices, the energy output of an active expander may not be sufficient to justify its additional complexity and manufacturing expense. However, industrial process dryers can be very large; for such systems, the energy output of an active expander can be advantageous.

Advanced Refrigerant and Equipment for Using Same

In the interest of entirely eliminating hydrocarbons, fluorines, and chlorines from the heat pump, it is advantageous to use water as the refrigerant. A heat pump system intended for water based working fluid presents novel equipment design considerations, which offer manufacturing advantages, as well as zero ODP and zero GWP.

A heat pump system using water as the refrigerant will operate at substantially lower pressures and higher volume flow than with conventional refrigerants. Heat pump equipment designed for water based refrigerant will have commensurately different requirements.

Typical system pressures in a heat pump using water based refrigerant, operating in the preferred temperature range of a heat pump process dryer, are <1 PSIA on the low side, and <10 PSIA on the high side. Refrigerant volume flow rates are substantially higher than with conventional systems. The water vapor compressor for some embodiments comprises a hybrid design, resembling a high pressure blower as much as a conventional heat pump compressor.

In some embodiments, a suitable compressor is a rotary vane type, optimized to handle deep vacuum on the low side, and high differential pressure, as compared with typical rotary vane devices. Some embodiments comprise regenerative blower stages. Conventional regenerative blowers are not capable of sufficient differential pressure for use in a heat pump; some embodiments comprise a plurality of cascaded regenerative blower stages. An embodiment for very large systems may comprise one or more turbine compressors, in parallel and/or cascaded.

The low pressure side of this system operates at a substantial vacuum with respect to ambient atmospheric pressure. To accommodate this, suitable means to prevent air from infiltrating the system through shaft seals, or the like, are needed. For this purpose, and for motor cooling, the compressor is encased in a hermetic shell or semi-hermetic housing, similarly to conventional heat pump compressors, and the entire refrigerant circuit is hermetic.

In conventional systems, refrigerant soluble lubricant is used in the compressor. A small amount invariably escapes the compressor through piston rings, scroll seals, or the like. The escaped lubricant is permitted to circulate throughout the refrigerant circuit, and eventually returns to the compressor at the suction side.

Some compressor embodiments for use with water refrigerant is an oilless type, requiring no lubricant. A cascaded regenerative blower assembly is a good example of same.

Some embodiments, which may be advantageous for some applications, incorporate a water soluble lubricant that is permitted to circulate throughout the refrigerant circuit. The lubricant will not materially compromise the thermodynamic properties of the water refrigerant.

Water refrigerant introduces the possibility of corrosion. In some embodiments, refrigerant piping is stainless steel or nonmetallic, and piping corrosion is not an issue. Corrosion in the compressor may be addressed with a plurality of methods.

Some embodiments employ corrosion inhibitors in the refrigerant or soluble lubricant. An alternate method, which may be used with or without corrosion inhibitors, is the use of corrosion resistant materials (e.g., stainless steel, or nonmetallics) or corrosion resistant platings or coatings, for refrigerant contacting components.

Some embodiments comprise oxygen getter means installed in the system piping. Such means remove entrained oxygen from said water refrigerant, typically during the first minutes or hours of run time, mitigating or eliminating corrosion in the compressor, piping, and in all system components that contact the refrigerant.

The getter media may react with available oxygen, converting it to an inert compound that remains captivated in the getter media, absorbs oxygen, or may use any suitable means for removing available oxygen from the system.

In some hermetic embodiments, the getter media is a single use type, that is substantially consumed in the oxygen removal process. The getter media may be packaged in a sealed canister that is installed in the refrigerant circuit during system manufacture, removes available oxygen upon first use, and subsequently becomes a permanent passive component, much like the filter/dryer used in conventional systems.

Heat exchangers for use with water based refrigerant will also depart from conventional heat pump HX design. In light of the low operating pressures and high volumetric flow rates, classical small bore shell and tube configurations will not perform properly. Some embodiments comprise shell and tube type heat exchangers optimized for high volume refrigerant flow. Some HX embodiments comprise comparatively large diameter inlet and exhaust ports manifolded to a substantial plurality of parallel flow tubes or channels. The low operating pressures will permit inexpensive HX materials and designs.

The refrigerant piping design will also be a departure from conventional systems. It will preferably be of larger diameter, and may be of lighter and less expensive materials, such as aluminum, PVC, or other suitable polymer. Stainless steel may be used if desired. In some embodiments, PVC, ABS, PEX, or the like is used for piping, with hermetic connections, e.g., solvent welded, offering substantially reduced manufacturing cost over conventional systems.

Antibacterial

Ultraviolet sources, e.g., LED's or fluorescent tubes, will substantially mitigate pathogen growth in the drying loop. UV-B sources, or preferably UV-C sources for improved operator safety, positioned so the UV light penetrates the space between the heat exchanger fins, will be very effective.

While said UV sources are located in the evaporator section, which tends to be damp, they may be placed anywhere in the drying air loop, as desired. In some embodiments, said UV sources are hot water and steam tolerant, for CIP purposes.

Retrofit and Prior Art Considerations

In the interest of simplicity, the present invention has been shown and substantially discussed herein in single stage downdraft embodiments. While single stage and downdraft configurations are common in industry, both singly and in combination, there are a variety of alternative configurations, also in common use, which the present invention is fully compatible. The most common configurations are discussed and illustrated herein.

Two Stage Drying

Conventional Two Stage Operation

While single stage drying is very effective, and relatively simple to implement, it presents some disadvantages, such as high temperature operation, e.g., for dairy operations, on the order of 400° F. As a result, single stage systems are prone to product degradation, including but not limited to lipid and protein damage, particle ballooning and fracturing, and nitrate/nitrite contamination.

Figure 6:
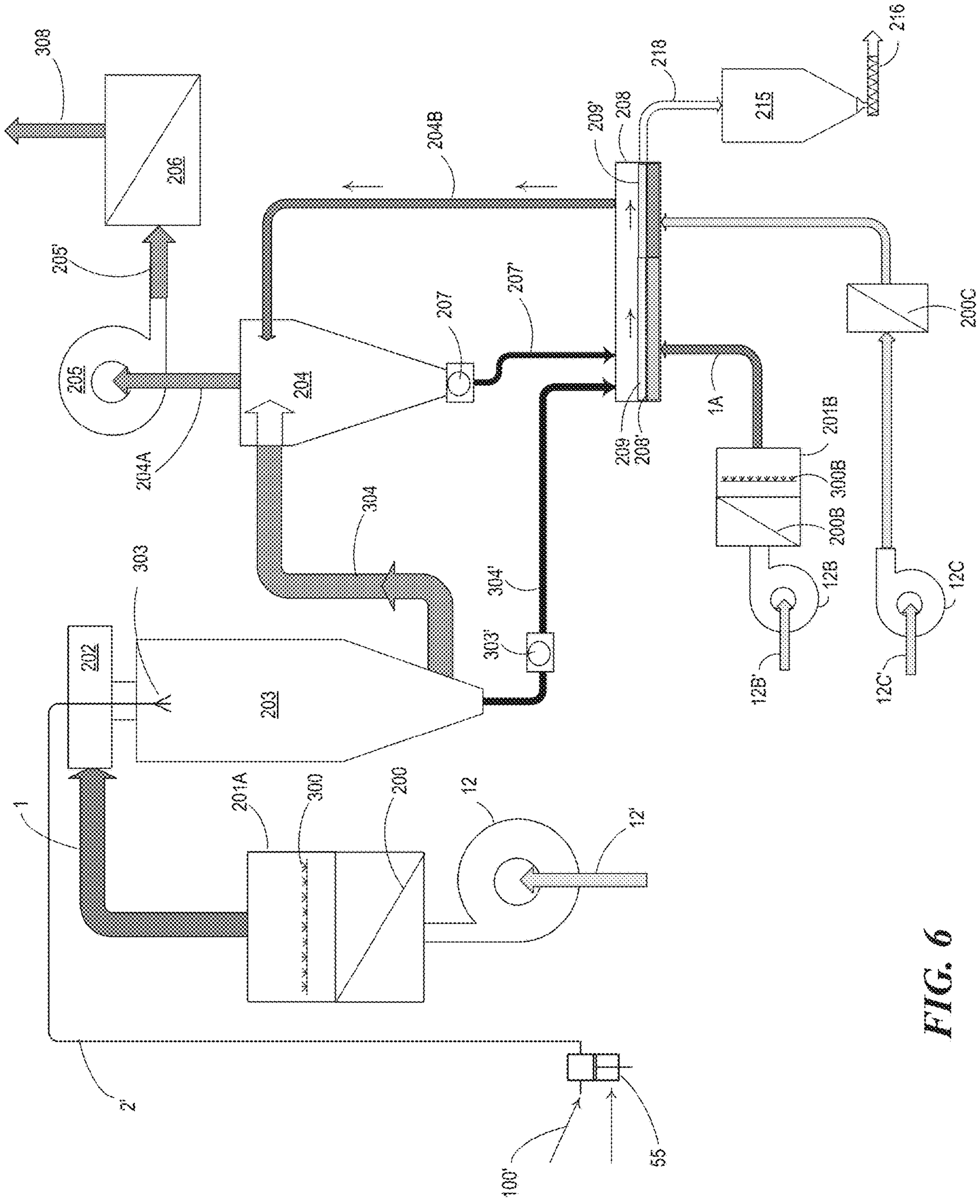
FIG. 6 is a prior art example of a two stage spray dryer.

FIG. 6 is a prior art example of a two stage spray dryer. Two stage spray drying was developed to permit operating the drying chamber at lower temperatures. As shown in FIG. 6, drying chamber 203 communicates with a second drying stage 208 (also referred to as fluidized bed 208), rather than directly to the product tank. This second stage is commonly available in two types, vibratory fluidized bed and filter belt. FIG. 6 illustrates a vibratory fluidized bed configuration for milk or whey powder production.

Operation of this type of dryer is as follows:

Drying air enters furnace 201A via blower 12 and filter 200, where it its heated to suitable drying temperature, typically 50°-100° F. lower than in a single stage dryer. This produces product powder that is higher in moisture, on the order of 12% DS, than a single stage dryer, which typically produces product at 4%-5% DS. Moisture content is maintained just shy of the sticking threshold, to allow powder to contact drying chamber 203 funnel bottom, and the fluidized bed, without adhering to same.

Partially dry product and a small amount of drying air exits drying chamber 203 via rotary valve 303' and duct 304' and enters fluidized bed 208, where it lands on vibrating plate 208', forming a powder bed in first and second sections, respectively drying powder bed section 209, and cooling powder bed section 209', shown in FIG. 6 as different shades of gray. Plate 208' comprises fine perforations over its entire surface, small enough to prevent powder particles from falling through said plate, while allowing air to flow upward through same.

Plate 208' and the bottom of the housing of fluidized bed 208 comprise a drying air plenum, which is divided into two sections corresponding to powder bed sections 209 and 209'. Said plenum is either divided by a suitable vertical baffle (not shown) or provided as separate drying and cooling assemblies, cascaded by suitable ducting.

Heated air supplied by furnace 201B, via blower 12B and filter 200B, is conveyed to the underside of the first section of plate 208' via duct 1A, flows upward through the powder bed section 209, further drying same, and then exiting via duct 204B, and tangentially entering cyclone separator 204.

Plate 208' vibrates continuously during operation, keeping the product powder bed fluidized, and allowing thorough exposure of the powder particles to the drying air. Said vibratory motion is typically orbital or equivalent, to promote travel of the powder bed along plate 208' to exit duct 218, and product tank 215.

The second section of fluidized bed 208, whether integrated as shown, or as a separate unit, serves to cool the powder product. Ambient air enters the underside of said second section via blower 12C and filter 200C, and travels upward through plate 208' and powder bed section 209', and travels along with exiting drying air from said first section, via duct 204B, to separator 204.

Small amounts of powder fines that escape fluidized bed 208, are returned by separator 204 back to fluidized bed 208, via rotary valve 207 and duct 207', where they tend to agglomerate with larger partially dry particles entering, via duct 304' and rotary valve 303', from drying chamber 203.

The bulk of the drying air exits drying chamber 203 via duct 304 and also tangentially enters cyclone separator 204. Although shown in FIG. 6 as two separate entrances to separator 204, it is also common for ducts 204B and 304 to be combined into a single duct that enters separator 204. The combined drying air from drying chamber 203, and fluidized bed 208, exits separator 204 via duct 204A, blower 205, duct 205', and filter 206; and is released to the atmosphere.

Air supplied to fluidized bed 208 by furnace 201B is typically heated to a temperature higher than the drying air exiting drying chamber 203, and lower than drying air entering drying chamber 203. Fluidized bed 208 provides extended drying dwell time, permitting relatively slow low temperature drying.

While two stage dryers are significantly more expensive to manufacture, they mitigate many of the issues associated with single stage drying. They are also slightly more efficient, consuming in the aggregate about 10% less than an equivalent single stage dryer.

Heat Pump Closed Loop Two Stage Drying

Figure 6A:
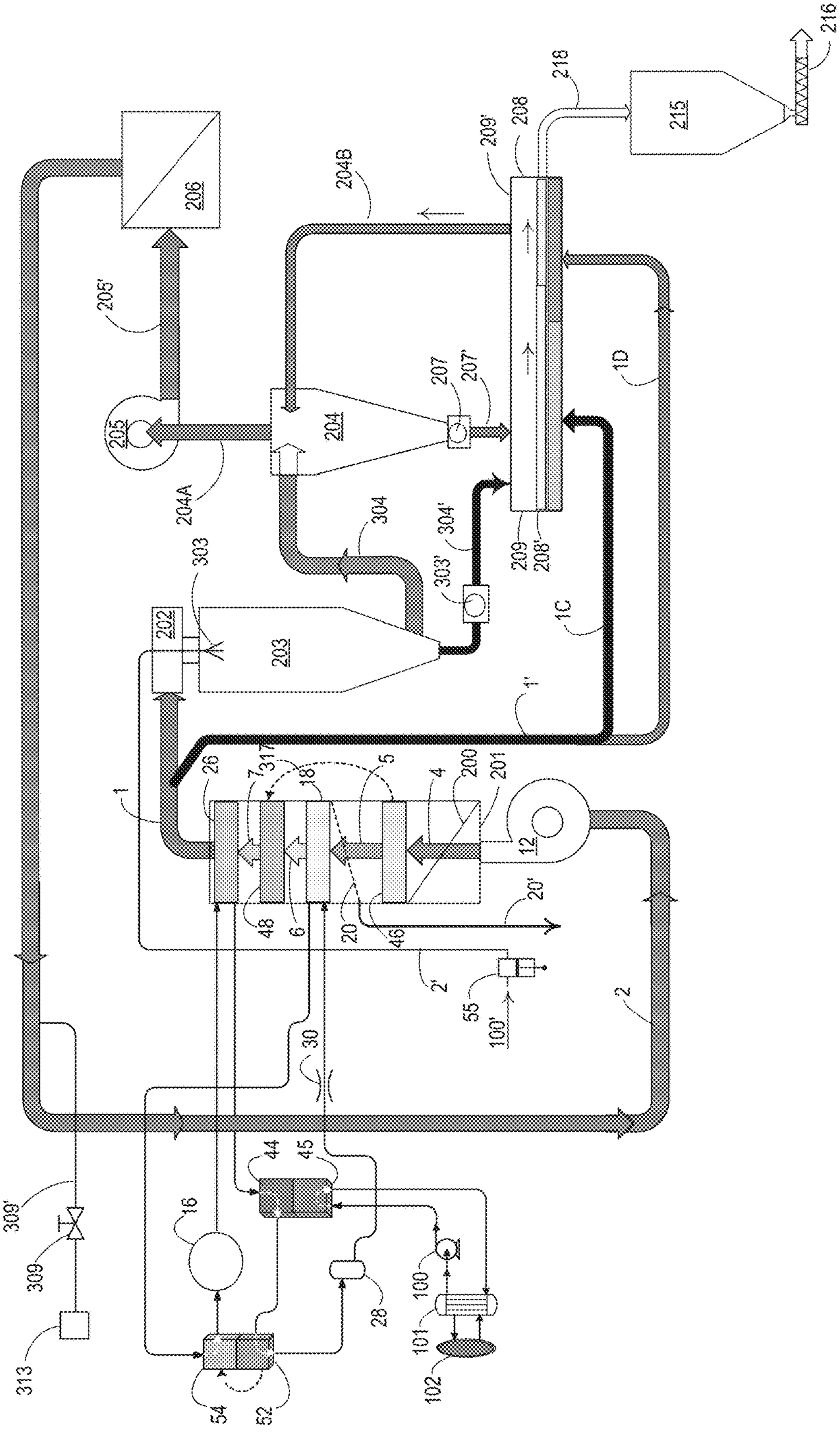
FIG. 6A shows a first embodiment of the present invention applied to a two stage spray dryer.

Referring now to FIG. 6A, FIG. 6A shows a first embodiment of the present invention applied to a two stage spray dryer. This embodiment operates as does the conventional two stage dryer of FIG. 6, except that drying air is supplied to both sections of fluidized bed 208 by heat pump air handler 201, via ducts 1', 1C and 1D.

Said drying air from heat pump air handler 201 is at very low humidity and very low temperature, typically 160°-180° F., presenting powder drying performance in fluidized bed 208, substantially equal to that of the fluidized bed in an equivalent conventional two stage dryer.

In some heat pump closed loop embodiments the need for both furnaces, 201A and furnace 201B, are eliminated and provide all the features and benefits of the present invention.

Separate Heat Pumps for Two Stage Dryer

Conventional two stage dryers employ a separate furnace 201B for the fluidized bed, in order to provide independent temperature control and heat capacity control. This capability is generally not necessary in the present invention because all drying temperatures are equal to or less than the drying air temperature at any point in a conventional dryer.

Figure 6B:
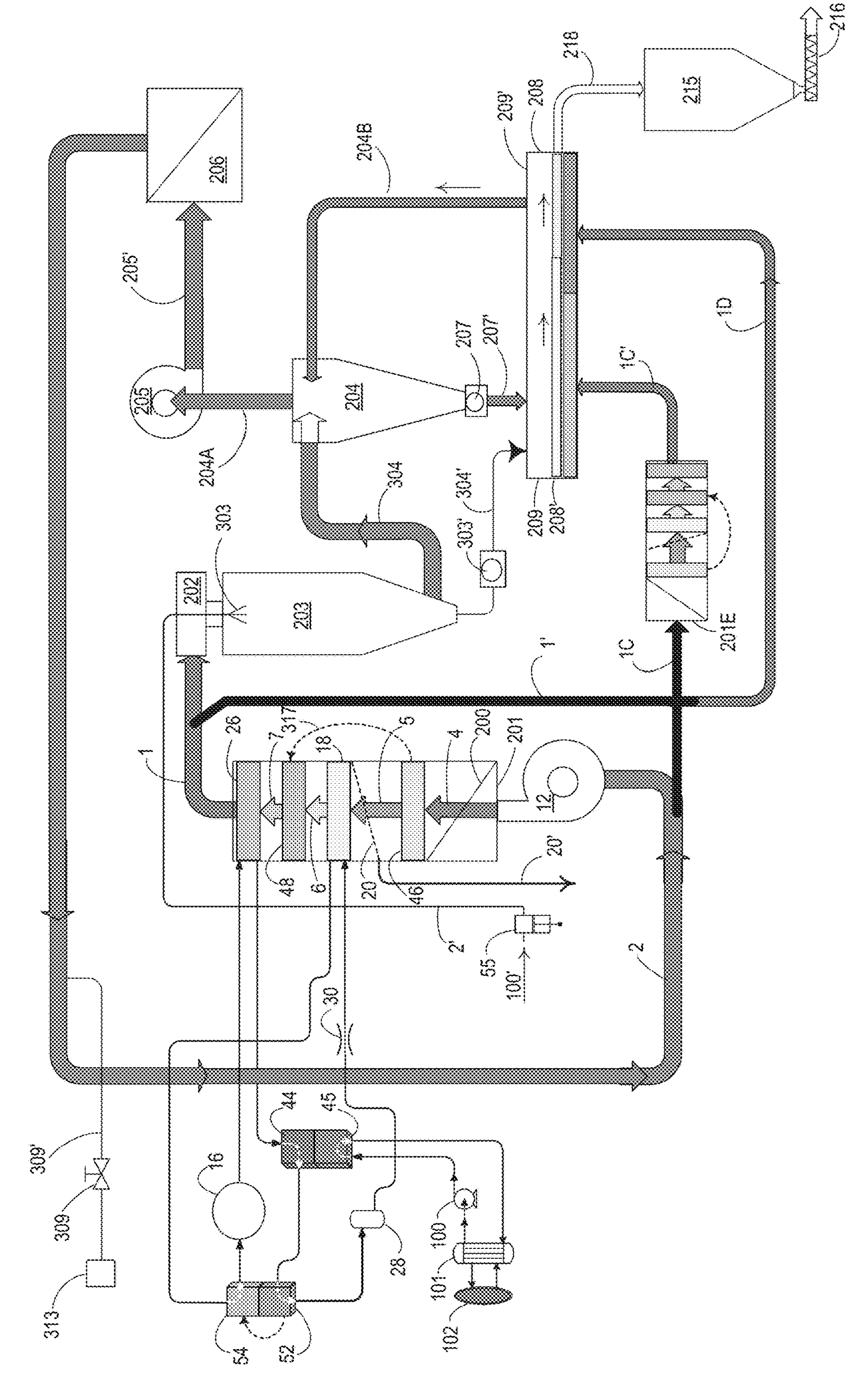
FIG. 6B shows a second embodiment of the present invention applied to a two stage spray dryer and comprising two heat pumps for separate control of each stage.

However if separate control is desired for a particular application, the embodiment shown in FIG. 6B provides same. FIG. 6B shows a second embodiment of the present invention applied to a two stage spray dryer and comprising two heat pumps, for separate control of each stage.

In some embodiments, drying air is not provided to fluidized bed 208 by heat pump air handler 201. Rather, said drying air is provided to fluidized bed 208 by separate heat pump air handler 201E, via duct 1C'. Heat pump air handler 201E receives return air via return air duct 2, duct 1C, and filter 206, and dehumidifies said return air and heats it, in the same manner as heat pump air handler 201 does in drying chamber 203 air circuit.

Heat pump air handler 201E may be driven by a dedicated refrigerant system (not shown), as is air handler 201, or may be driven by the same refrigerant system as air handler 201, as desired.

Heat pump air handler 201E, whether driven by a common refrigerant system or its own, consumes energy as does heat pump air handler 201. However, the combined energy consumption of both heat pumps in this embodiment is nominally equivalent to the heat pump consumption of said first embodiment, and this embodiment presents substantially equivalent energy consumption.

This embodiment provides all the features and benefits of the present invention, as does said first two stage embodiment, and permits independent control of drying air temperature for drying chamber 203 and fluidized bed 208.

Three Stage Drying

Conventional Three Stage Operation

Two stage drying is well suited for milk and whey products. It does however have some limitations. These dryers tend to operate very near the sticking threshold, and are unsuitable for viscous, sticky or thermoplastic products, such as baby food, yogurt, or the like. Three stage drying addresses this by preventing the partially dry powder from contacting any part of the equipment until it is completely dry. This is accomplished with a plurality of techniques. In a three stage dryer, drying chamber 203 comprises a mixed flow configuration, and the second stage is effectively moved to the bottom of said drying chamber.

Figure 7:
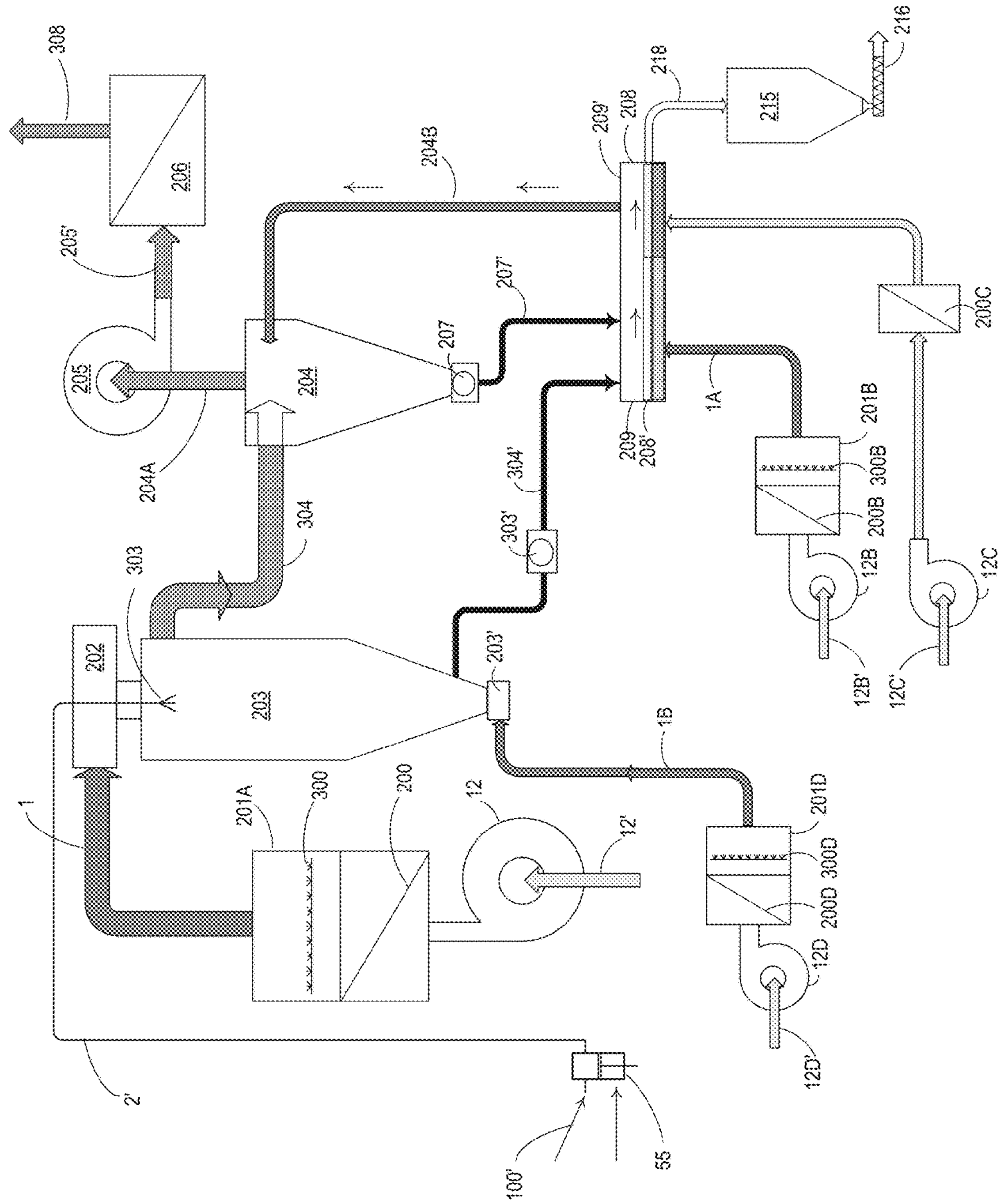
FIG. 7 is a prior art example of a three stage spray dryer.

FIG. 7 is a prior art example of a three stage spray dryer. In one common embodiment, shown in FIG. 7, in addition to the drying air entering drying chamber 203 via duct 1 and plenum 202, an additional heated drying air stream is introduced at the bottom of drying chamber 203 via blower 12D, filter 200D, furnace 201D, duct 1B, and plenum 203'.

This additional drying air stream is updraft, and fluidizes the partially dry powder as it collects in the cone section of drying chamber 203, similarly to the drying air introduced under plate 208' in fluidized bed 208. The primary drying air discharge from drying chamber 203 is located at the top (either on the side as shown, or vertically from the top cover plate) and travels to cyclone separator 204 via duct 304. This configuration causes the primary drying air flow to be torroidal, increasing drying dwell time, and substantially prevents partially dry powder from contacting the inner surface of drying chamber 203.

A small amount of drying air, with product powder entrained, exits drying chamber 203, and enters fluidized bed 208 via rotary valve 303' and duct 304', where it is further dried.

An alternate configuration, not shown, also in wide use, comprises a drying chamber without a conical bottom section. Instead, this type of drying chamber tapers outward, and is slightly larger at the bottom than its upper diameter. Said drying chamber is situated directly over the starting end of the fluidized bed assembly, allowing partially dry powder to fall directly onto the fluid powder bed, without contacting any part of the equipment until it is fully dry.

Steam injection, not shown, is often provided to a small section at the start of the fluidized bed to encourage agglomeration, desirable for products such as powder milk, for higher solubility and ease of reconstitution.

An alternate type of three stage dryer, not shown, comprises a unit similar to a fluidized bed assembly, but instead of a vibratory plate, includes a full length traveling belt that wraps completely around under the unit. Said belt is comprised of suitable fine filter media that retains the powder product, but allows air to travel through the product bed to suction means below said belt. Unlike vibratory types, filter belt dryers are downdraft.

Three stage dryers are well suited for handling viscous and/or sticky products, such as baby food, yogurt, and the like, without fouling.

Heat Pump Closed Loop Three Stage Drying

Figure 7A:
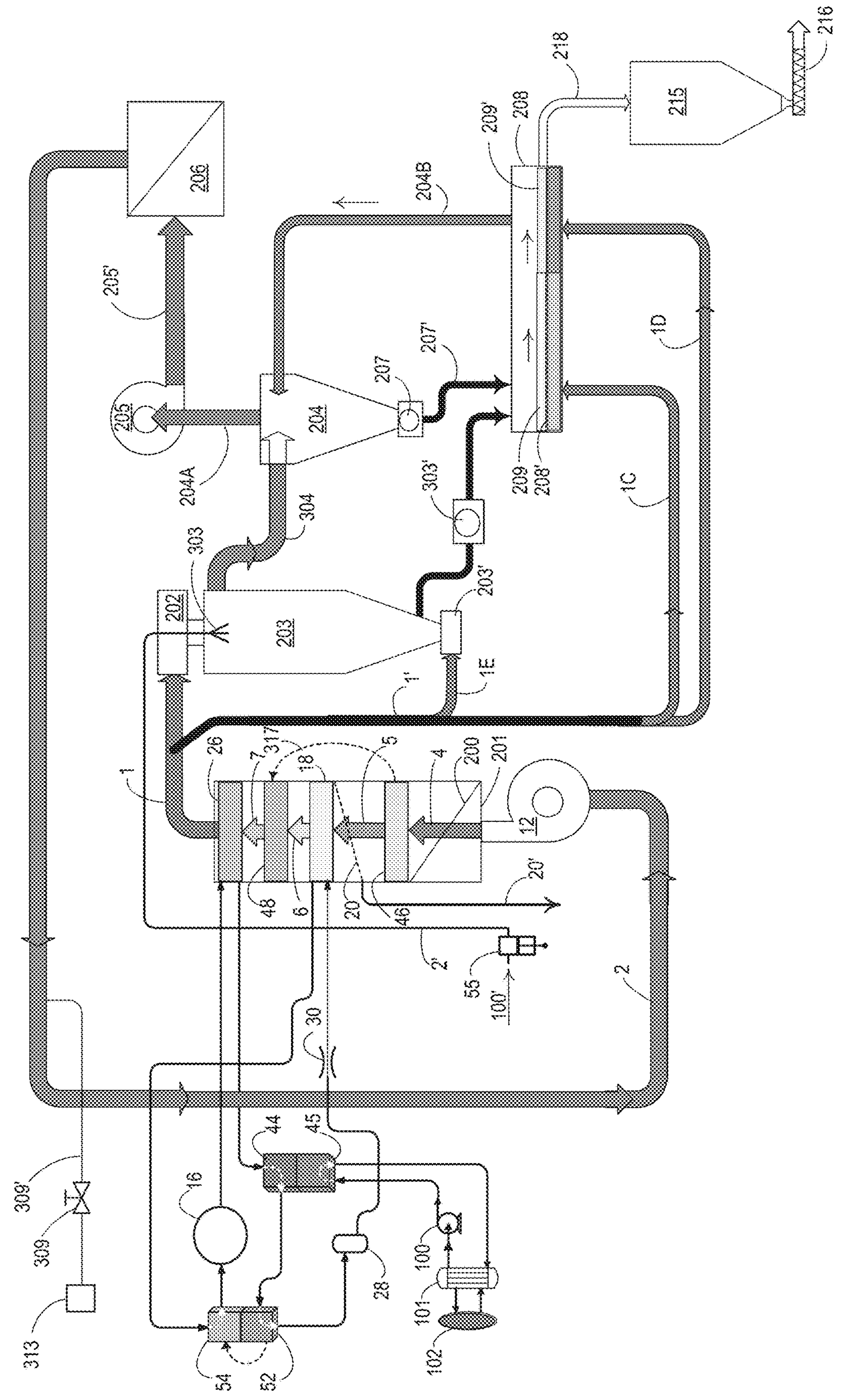
FIG. 7A shows a first embodiment of the present invention applied to a three stage spray dryer.

FIG. 7A shows a first embodiment of the present invention applied to a three stage spray dryer. This embodiment operates as does the conventional three stage dryer of FIG. 7, except that drying air is supplied to both sections of fluidized bed 208 by heat pump air handler 201, via ducts 1', 1C and 1D, and to the fluidized bed section of drying chamber 203, via ducts 1' and 1E, and plenum 203'.

Said drying air from heat pump air handler 201 is at very low humidity and very low temperature, typically 160°-180° F., presenting powder drying performance in fluidized bed 208, substantially equal to that of the fluidized bed in an equivalent conventional three stage dryer.

This heat pump closed loop embodiment eliminates the need for all furnaces 201A, 201B, and 201D, and provides all the features and benefits of the present invention.

Separate Heat Pumps for Three Stage Dryer

Conventional three stage dryers employ a separate furnace 201B for external fluidized bed 208, and furnace 201D for the internal fluidized bed in drying chamber 203, in order to provide independent temperature control and heat capacity control. This capability is generally not necessary in the present invention because all drying temperatures are equal to or less than the drying air temperature at any point in a conventional dryer.

Figure 7B:
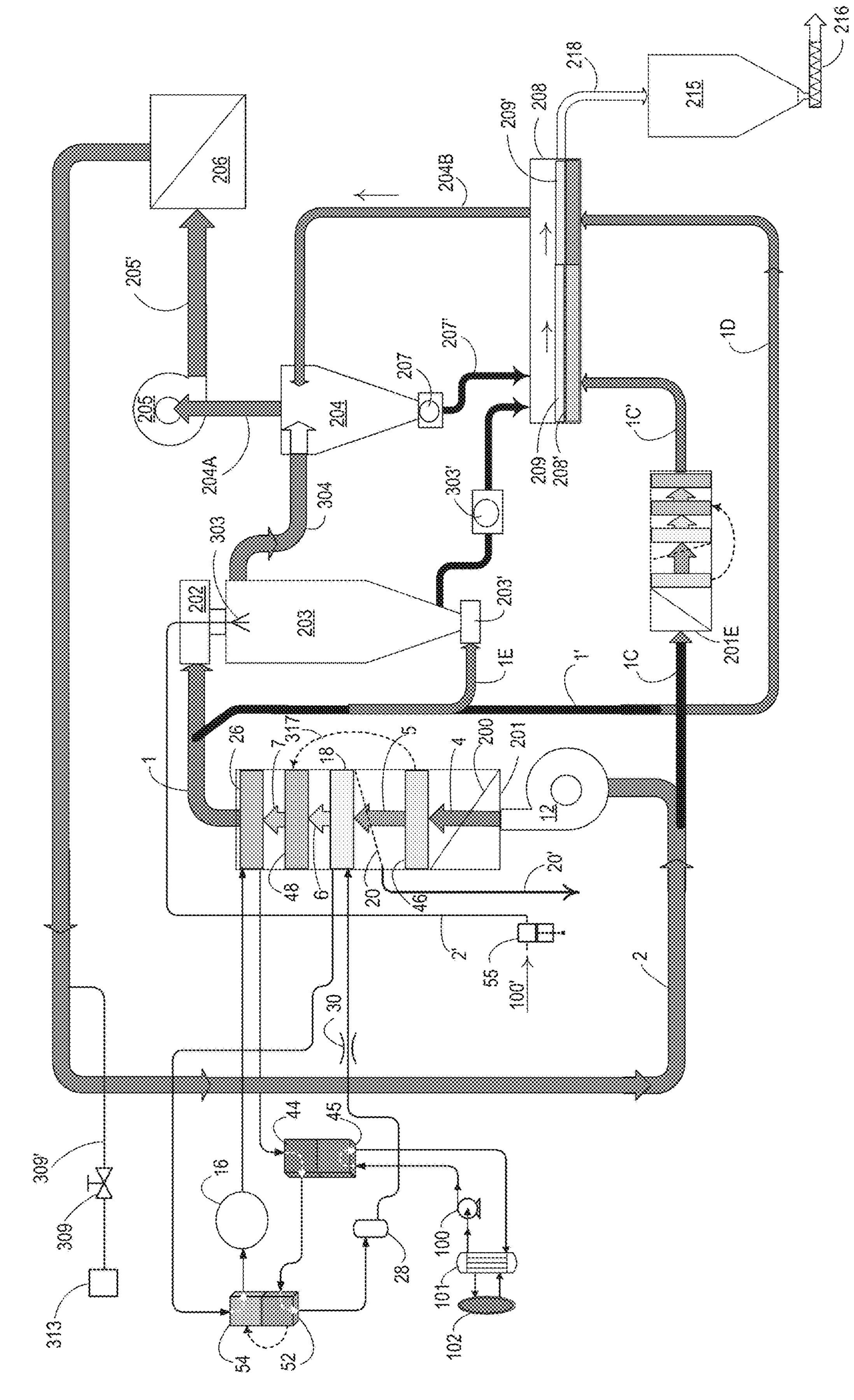
FIG. 7B shows a second embodiment of the present invention applied to a three stage spray dryer and comprising two heat pumps, for separate control of two stages.

However if separate control is desired for a particular application, a second three stage embodiment shown in FIG. 7B provides same. FIG. 7B shows a second embodiment of the present invention applied to a three stage spray dryer and comprising two heat pumps, for separate control of two stages. In said embodiment, drying air is not provided to fluidized bed 208 by heat pump air handler 201. Rather, said drying air is provided to fluidized bed 208 by separate heat pump air handler 201E, via duct 1C'. Heat pump air handler 201E receives return air via return air duct 2, duct 1C, and filter 206, and dehumidifies said return air and heats it, in the same manner as heat pump air handler 201 does in drying chamber 203 air circuit.

In some embodiments, drying air to the internal fluidized bed in the bottom of drying chamber 203, is not provided by heat pump air handler 201. Rather, said drying air is provided to the bottom of drying chamber 203 by separate heat pump air handler (not shown), via duct 1E' (not shown). The separate heat pump air handler receives return air via return air duct 2, duct 1E, and filter 200B, and dehumidifies said return air and heats it, in the same manner as heat pump air handler 201 does in drying chamber 203 air circuit.

The heat pump air handler 201E and the separate heat pump air handler consume energy as does heat pump air handler 201. However, the combined energy consumption of all heat pumps in this and other embodiments is nominally equivalent to the heat pump consumption of said single heat pump three stage embodiment, and this embodiment presents substantially equivalent energy consumption.

This embodiment provides all the features and benefits of the present invention, as does said first three stage embodiment, and permits independent control of drying air temperature for both upper and lower sections of drying chamber 203, and fluidized bed 208.

Legacy Prior Art

An example of a legacy prior art single stage dryer, circa 1970, is shown in FIG. 8. This type of dryer functions in the same manner as the single stage examples discussed herein, but includes additional post drying components. As shown in FIG. 8, this type of dryer includes small cascaded cyclone separators 210 and 211, downstream of primary cyclone separator 204.

Separators 210 and 211 are referred to by the manufacturer as cooling collectors. They receive ambient air via filter 222, which cools the dry product. Separators 210 and 211 also provide supplemental powder fines extraction. Said fines are returned to primary separator 204 via ducts 210A and 211', and blower 220.

Duct 205' and liquid collector 224 include an array of spray nozzles that inject incoming milk, directly from the receiving silo, as a fine mist. This mist is intended to collect any powder fines that escape separator 204 in lieu of modern HEPA filtration. Said mist collects as fluid milk at the bottom of liquid collector 224, and is routed via product pump 306 to the start of the production process, as the primary feed stock.

This example also includes flex links 213A, 213B, 213C, and orbital screener 214 which breaks up and/or removes large agglomerations from the product before storing. Orbital screener 214 is not a part of the present invention, and is not shown in other figures for simplicity, but is often found in present day installations.

Figure 8A:
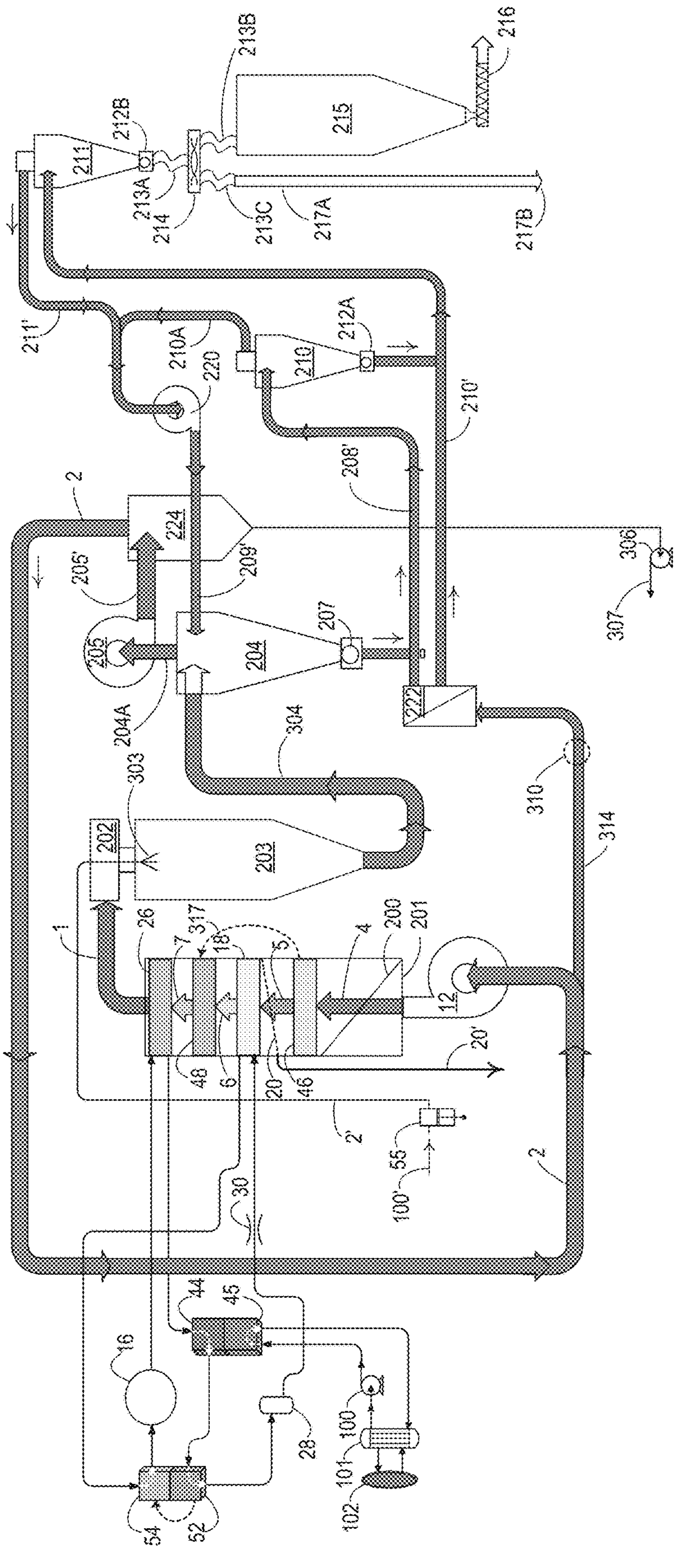
FIG. 8A shows an embodiment of the present invention applied to said legacy spray dryer.

The present invention is fully compatible with this type of dryer, and may be retrofitted as shown in FIG. 8A. Furnace 201A is replaced with the heat pump assembly and heat pump air handler 201. Instead of venting to the atmosphere, discharge air from liquid collector 224 is routed back to heat pump air handler 201 via return duct 2 and blower 12. Some retrofit embodiments are independent of post dry components specific to this type of legacy dryer, and function the same as the single stage embodiment of FIG. 3.

Retrofit and New Construction Considerations

Some heat pump closed loop drying embodiments discussed herein apply well to retrofit applications, fundamentally preserving the original configuration, e.g., single, two, or three stages, fluid bed stage, and the like. However, for new construction, in many applications second and third stages are not needed, because heat pump closed loop drying is intrinsically cooler than conventional multistage drying can achieve. For new units, second and third stages are effectively optional, and may be included or deleted as desired, for any particular application.

Two Fluid Atomization Nozzles

The spray drying industry employs three commonly used nozzles, static pressure types, rotary types, and two fluid types. Static pressure nozzles, the primary type used in the dairy sector, typically comprise a unitary orifice, and are fed at very high pressure, on the order of 4,000 PSI. Fluid exiting said orifice atomizes instantly upon exiting.

Rotary nozzles comprise a motorized high speed wheel with vanes and/or circumference penetrations, spinning inside a close fitting housing which also has circumference penetrations. Product fluid is fed at the center of said wheel, and centrifugal force expels the fluid through said circumference penetrations, atomizing said fluid. Feed pressure is typically low; the wheel supplies the energy for atomizing the feed fluid.

Two fluid nozzles are stationary types in which the feed fluid is also delivered at low pressure, and compressed air or steam is fed coaxially. Said high pressure air or steam atomizes the feed fluid. This type of nozzle requires an air or steam supply.

Figure 9:
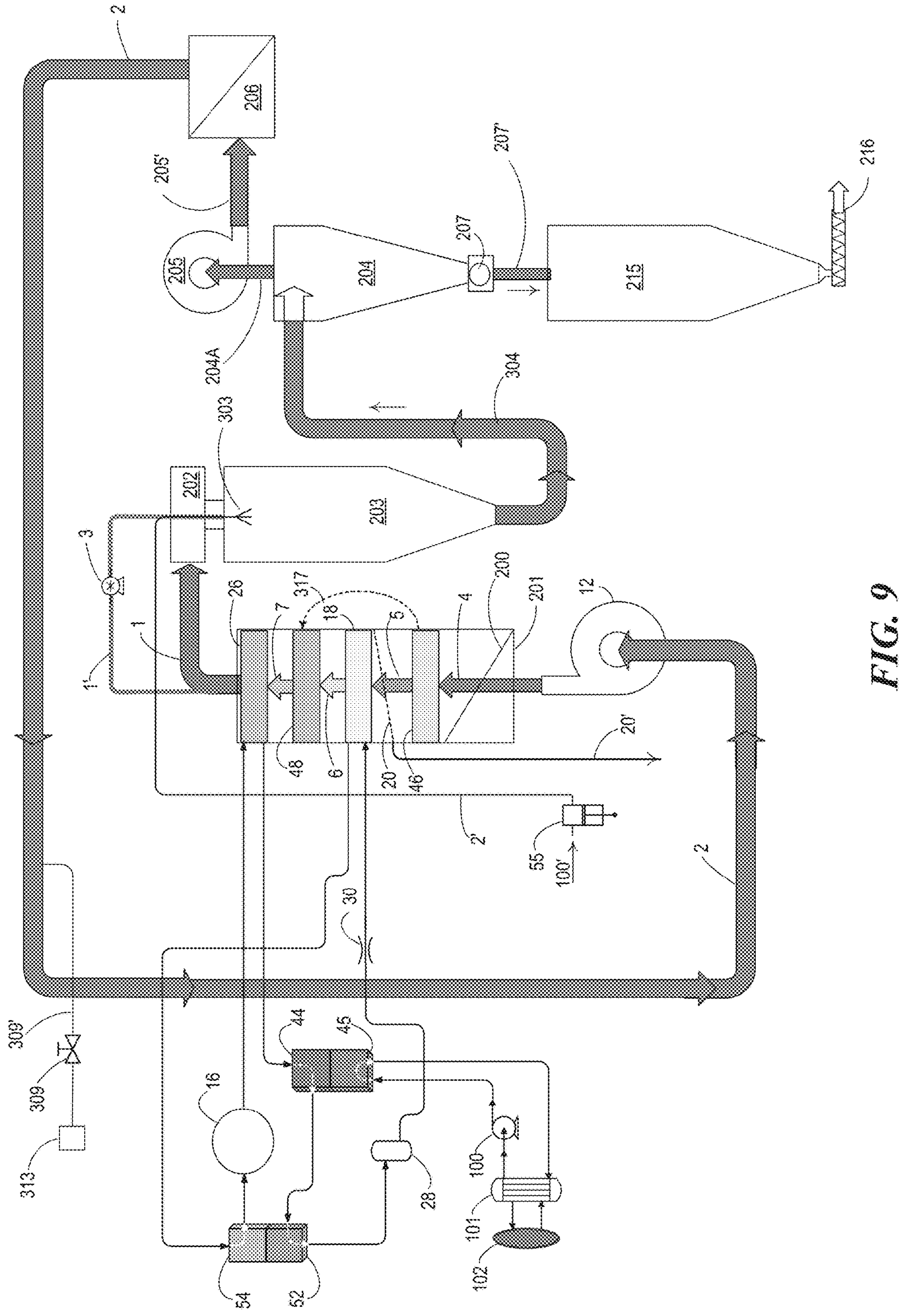
FIG. 9 shows an embodiment of the present invention applied to a two fluid atomization nozzle.

Simple heat pump closed loop embodiments that employ a two fluid nozzle are shown in FIG. 9. In some embodiments, compressed drying air is supplied to two fluid spray nozzle 303, via ducts 1 and 1' and compressor 3. These embodiments eliminate the need for external compressed air, preserving the closed drying air loop, and the function and performance of spray nozzle 303.

Appendix A: Theoretical Considerations

Three States of Drying

In convective drying, there are three discernible states in the transition from wet to dry product, Warmup or Rising Rate, Steady Rate, and Falling Rate.

Warmup is the first state of convective drying. In this state, the product is at its highest moisture content, and the drying air is relatively dry. At this stage, the surface temperature of the product to be dried is lower than the wet bulb temperature of the drying air. This is the driving mechanism during warmup. The wet bulb temperature of the drying air must be reduced, and the surface temperature of the product must be increased. The drying air therefore transfers heat to the product, and the product transfers moisture to the air. This mechanism will stop when the equilibrium condition is met, i.e., when the surface temperature of the product equals the wet bulb temperature of the drying air.

During Steady Rate drying, the surface temperature of the product remains constant, as does the wet bulb temperature of the drying air. There is stable transfer rate of moisture from each droplet core to its surface, and from each droplet surface to the air. The drying chamber is effectively adiabatic during this time. The mechanism for drying in Steady Rate is the difference in partial pressures between water in the air/product boundary layer, and water in the bulk air (discussed further below in Low Temperature Drying Mechanism). Steady Rate continues while the cores of the droplets have sufficient moisture to feed the surface at the same rate as their surfaces release moisture to the drying air.

However, at some point there will no longer be enough moisture in the core of the droplets to sustain this, the droplet will have effectively transitioned to a wet solid, and mass transfer will begin to slow the process down. This threshold is referred to as the Critical Moisture Content. The Critical Moisture Content varies with the size and shape of each droplet, as well as the product itself.

Falling Rate is the last and least efficient state of drying. In this state, there is insufficient moisture near the surface of the product to keep the partial pressure of water in the air/product boundary layer constant. As this partial pressure decreases, the driving force behind drying is reduced. Mass transfer is therefore the bottleneck during this state, as the drying air can remove only the moisture on the surface. Mass transfer is the movement of moisture through the product from the core to the surface, and is governed by two variables: the product itself, and its internal energy.

The product cannot be changed, so the only variable that can be used to increase the driving force for drying is the internal energy of the product. It is relatively difficult to transfer heat via convection during this state, and the drying rate therefore falls continuously until it becomes asymptotic. This is the practical limit for convection drying.

Spray Drying Considerations

This all happens very quickly with spray drying, as the droplet diameter and mass transfer constraints are very small, and the aggregate surface area is very high. However, although the process happens quickly, it nonetheless follows the same rules, and exhibits the same states of drying, rising rate, steady rate, and falling rate.

Steady rate is typically completed in a matter of milliseconds. The commencement of falling rate coincides with the Critical Moisture point of the product, and the formation of a hard crust on the surface of the droplet, as it transitions to a wet solid. The remaining balance of moisture in the droplet core is removed during falling rate, and is subject to mass transfer constraints. Removal of moisture remaining at the critical point comprises the entire falling rate phase, substantially the balance of product residence time in the drying chamber.

Low Temperature Drying Mechanism

"Equilibrium Moisture Content

> In drying of solids, it is important to distinguish between hygroscopic and non-hygroscopic materials. If a hygroscopic material is maintained in contact with air at constant temperature and humidity until equilibrium is reached, the material will attain a definite moisture content. This moisture is termed the equilibrium moisture content for the specified conditions. Equilibrium moisture may be absorbed as a surface film or condensed in the fine capillaries of the solid at reduced pressure, and its concentration will vary with the temperature and humidity of the surrounding air. However, at low temperatures, e.g., 60° F. to 120° F., a plot of equilibrium moisture content vs percent relative humidity is essentially independent of temperature. At zero humidity, the equilibrium moisture content of all materials is zero."

(Perry & Chilton, *Chemical Engineers' Handbook*, Fifth Edition, McGraw-Hill)

The above excerpt illustrates the theory behind drying product at relatively low temperatures. The mechanism for this drying is not the boiling of water, but rather the tendency of two bodies with differing moisture content to reach equilibrium. This is the same mechanism that dries the skin in cold weather. It is driven by the difference between the partial pressures of water vapor in the drying medium (such as air) and on the surface of the moist product.

The surface of the product during Steady Rate drying is always at the wet bulb temperature of the surrounding air (the core of the product will be measurably colder than the surface). At the boundary layer between the product and the air, the temperature of both the product and the surrounding film of air will therefore be the wet bulb temperature. Since the product droplets are wet, the surrounding film of air will be saturated (100% rH).

There is a specific and known partial pressure of water vapor in this film of air which corresponds to 100% rH at the temperature of the boundary layer. The relative humidity of the bulk drying air is not 100%, it is in fact much lower, on the order of 2%. This corresponds to a lower partial pressure of water vapor in the bulk air.

This difference in partial pressures causes the water vapor in the boundary layer to migrate into the bulk air. This loss of water vapor is immediately replenished by the surface of the product, drying the product and remoistening the boundary layer air.

This mechanism relates to a drying rate in the following equation: Drying Rate$=h_t \cdot A \cdot \Delta_P$ In this equation, $h_t$ is the total heat transfer coefficient between the moist product and the convective drying medium (such as air). $\Delta$ is the total aggregate surface area of the moist product exposed to the drying medium. $\Delta$ is dependent on mean droplet size, droplet concentration in the air, and the size of the drying chamber. $\Delta_P$ is the partial pressure difference discussed earlier.

This equation shows that for a given droplet size and concentration in a drying chamber of a given size, the only variable that directly controls drying rate is the difference in partial pressures ($\Delta_P$). There are two ways of increasing $\Delta_P$ and therefore the drying rate; increasing the saturated partial pressure of water vapor at the boundary layer, or decreasing the partial pressure of water vapor in the bulk air.

A conventional dryer is incapable of decreasing the partial pressure of water vapor in the bulk air, because it draws room air, and the partial pressure of water vapor in air does not measurably change with the dry bulb temperature. Instead, a conventional dryer uses heat to increase the surface temperature of the product, which in turn increases the partial pressure of water vapor at the boundary layer.

To a small extent, the heat pump process dryer uses heat in the same manner, however it primarily uses the refrigerant evaporator to substantially decrease the overall moisture content of the bulk air that enters the drying chamber. This combined capability of reducing the partial pressure of water in the bulk air, and increasing the partial pressure of the water in the boundary layer, allows the heat pump dryer to dry faster, at lower drying chamber inlet temperatures, with substantially lower energy consumption. A conventional dryer cannot do this.

Low Temperature Drying Practical Considerations

During steady rate, increasing the drying chamber inlet temperature does not materially affect the drying chamber exhaust dew point. However, it does increase the drying chamber exhaust dry bulb temperature. This introduces significant sensible heat into the drying air, which must be removed before moisture condensation can commence.

This sensible heat represents parasitic work that is not used for drying. As the drying chamber inlet dry bulb temperature rises, the sensible heat burden rises concurrently. For a given evaporator size, it is possible for the sensible heat to exceed the evaporator cooling capacity, leaving no cooling capacity for condensation of water. It is substantially more efficient to operate with the lowest practical level of sensible heat.

There is a lower limit to this approach. If the drying chamber exhaust temperature is too low, then condensate may freeze on the evaporator surface. This has substantial compromising effect on air mass flow and heat transfer.

The present invention employs drying chamber inlet air that is as dry as practical, and operating temperatures just high enough to prevent freezing.

Low temperature drying reduces or eliminates warmup time, uses less energy, and is gentler to the product, materially reducing heat degradation, with no compromise in performance.

Methods of Drying a Product Using a Closed Loop System

Figure 10:
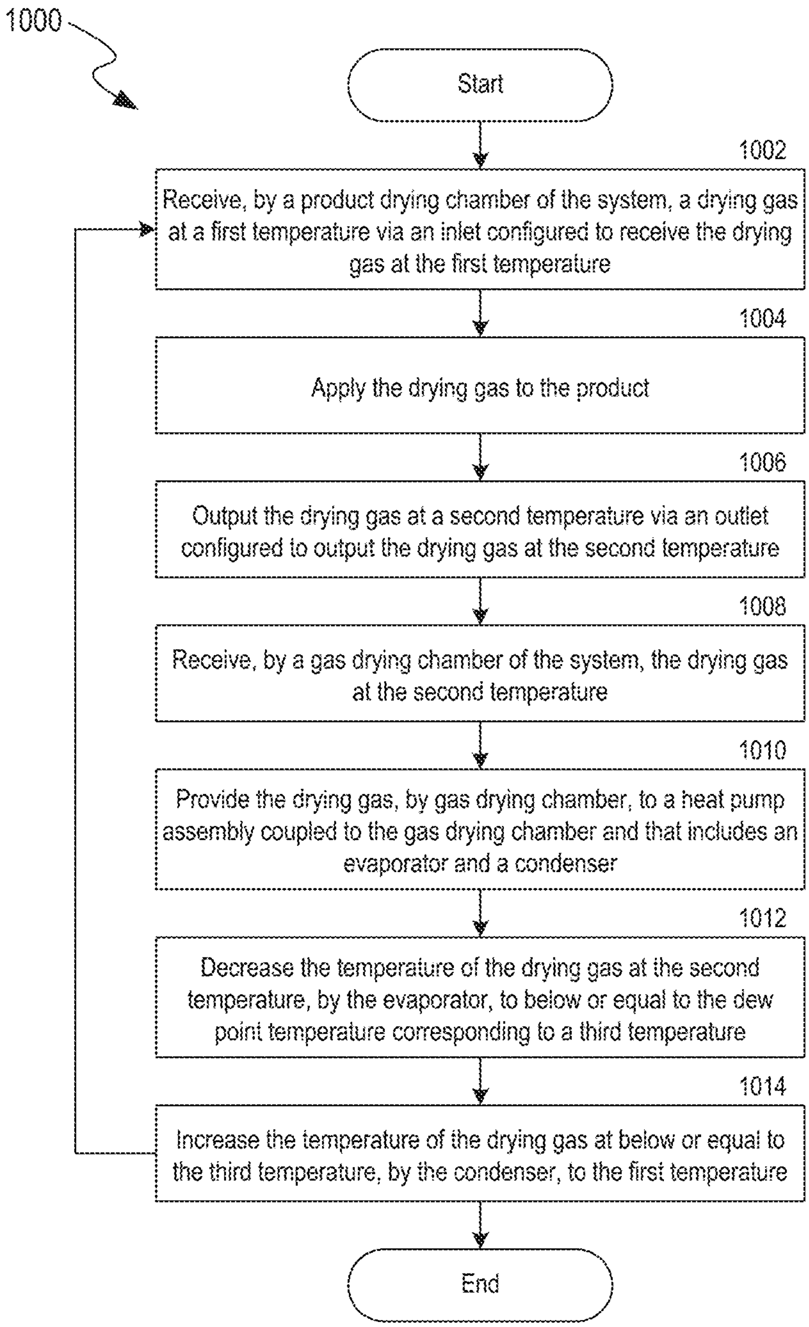
FIG. 10 is a flowchart that illustrates a process drying a product using a closed loop system.

FIG. 10 is a flowchart that illustrates a process 1000 drying a product using a closed loop system. The system includes a product drying chamber (e.g., drying chamber 203 discussed above) configured to dry a product and includes an inlet (e.g., plenum 202) configured to receive drying gas and an outlet (e.g., duct 304 and subsequent drying gas flow path shown, for example, in FIG. 2) configured to output drying gas at a different temperature. A gas drying chamber (e.g., heat pump air handler 201 discussed above) can receive the drying gas from the outlet of the product drying chamber and provide the drying gas to the inlet of the product drying chamber. A heat pump assembly is coupled to the gas drying chamber and includes an evaporator (e.g., evaporator 18 discussed above) configured to cool the drying gas received by the gas drying chamber and a condenser (e.g., condenser 26 discussed above) configured to heat the drying gas. As such, the product drying chamber and the gas drying chamber are configured to form the closed loop in which drying gas is circulated. In some embodiments, the drying gas is substantially comprised of an inert gas comprising zero percent oxygen. In some embodiments, the drying gas is ambient air. In some embodiments, due to the closed loop air flow pathway for the drying gas, emissions to the environment of product entrained in the drying gas (e.g., powder fines) are reduced or eliminated relative to conventional open loop drying systems. In some embodiments, the heat pump assembly can be configured to reduce or effectively eliminate emissions to the environment of hydrocarbon, fluorine, and chlorine relative to conventional open loop drying systems. For example, as discussed above, the heat pump assembly can use a water based refrigerant or water based cooling liquid, and can form an additional closed loop with regard to refrigerant or cooling liquid.

In some embodiments, a heat exchanger (e.g., air economizer 46/48 discussed above) decreases the temperature of the drying gas entering the drying gas chamber and provides the cooled drying gas to the evaporator. The heat exchanger can also be configured to receive cool drying gas from the evaporator and to heat the drying gas, as well as provide the heated drying gas to the condenser. In some embodiments, a hot portion (e.g., hot portion or hot section 46 discussed above) of the heat exchanger decreases the temperature of the drying gas and provides the drying gas to the evaporator. In some embodiments, the hot section removes substantially all of the sensible heat in the drying gas, relieving the evaporator of the sensible heat burden. This allows substantially all of the evaporator cooling capacity to be available for removing heat of evaporation and condensing moisture from the wet drying gas. In some embodiments, a cold portion (e.g., cold portion or cold section 48 discussed above) of the heat exchanger increases the temperature of the drying gas and provides the drying gas to the condenser (e.g., the cold section preheats the drying gas entering the condenser). In some embodiments, the combination of preheating provided by the cold section and cooling action provided by the hot section result in a heating capacity of the condenser being approximately equivalent to the cooling capacity of the evaporator.

At 1002, a product drying chamber of the system receives a drying gas at a first temperature (e.g., less than 200 degrees Fahrenheit, about 160-180 degrees Fahrenheit) and a first moisture content via an inlet configured to receive the drying gas at the first temperature and first moisture content. At 1004, the drying gas is applied to the product. At 1006, the product drying chamber outputs the drying gas at a second temperature and second moisture content via an outlet configured to output the drying gas at the second temperature and second moisture content. The first temperature is greater than the second temperature and the second moisture content is greater than the first moisture content.

In some embodiments, the drying gas exits the product drying chamber and is received by a wet air heatsink (e.g., the wet air heat exchanger/heat sink 315 described above). The wet air heatsink receives the drying gas in a hot side (e.g., a hot portion or hot section) of the heatsink. Ambient air enters a blower, passes through a cold side of the wet air heatsink, and extracts heat from the drying gas. The drying gas exits the wet air heatsink and passes to the gas drying chamber. In some embodiments, the wet air heatsink cools the drying gas via water or other cooling fluid rather than ambient air. The wet air heatsink is configured to further form a closed air flow loop with the gas drying chamber and the product drying chamber.

At 1008, the gas drying chamber receives the drying gas at the second temperature. At 1010, the gas drying chamber provides the drying gas at the second temperature to a heat pump assembly that is coupled to the gas drying chamber and includes an evaporator and a condenser. At 1012, the evaporator of the heat pump assembly decreases the temperature of the drying gas received by the gas drying chamber to less than or equal to the dew point temperature corresponding to a third temperature. The second temperature is greater than the third temperature. Moisture, previously extracted from the product in the product drying chamber, condenses out of the drying gas as it passes through the evaporator.

Drying gas exits the evaporator, cooled and effectively saturated, and enters the condenser of the heat pump assembly. At 1014, the condenser increases the temperature of the drying gas at less than or equal to the third temperature to the first temperature. The heated gas then exits the condenser and gas drying chamber at the first temperature, and at very low humidity, and reenters the product drying chamber, completing the cycle.

In some embodiments the heat pump assembly includes a subcooler (e.g., the subcooler 44/45 discussed above). The subcooler is a heat exchanger that is configured to receive refrigerant in a liquid state from the condenser. The subcooler cools the refrigerant and provides the refrigerant to the evaporator. In some embodiments, liquid refrigerant leaves the subcooler, passes through a thermal expansion valve (TEV, discussed above), and converts to a liquid/vapor state before entering the evaporator. In some embodiments, the subcooler is configured as an air cooled heat exchanger (e.g., suitable fan or blower means are included to deliver ambient air to the subcooler to cool the refrigerant passing through the subcooler). In some embodiments, the subcooler is liquid cooled. The subcooler is then used to supply process heat, e.g., evaporator preheat, feedstock preheat, CIP preheat, and/or space heat, to other sections of the facility.

Examples

The present technology is illustrated, for example, according to various aspects described below. These are provided as examples and do not limit the present technology.

In one example, a process drying apparatus comprises: (1) a chamber for containing product to be dried, (2) a means for supplying heated dry air other suitable drying gas at a first temperature to the chamber, and (3) a heat pump system. In some embodiments, the chamber containing product to be dried includes, but is not limited to, milk, whey, baking mixes, baby foods, grain, pharmaceuticals, metals, and the like. In some embodiments, the means for supplying heated dry air or other suitable drying gas at a first temperature to the chamber comprises a closed loop air flow pathway including a means for removing moisture from air exiting the chamber and for decreasing the temperature of the air to below dew point temperature, and further includes a means for increasing the temperature of the air exiting the moisture removing means to the first temperature. In some embodiments, the heat pump system comprises a means for passing a refrigerant in a vapor state through the temperature increasing means converting the refrigerant to a liquid state, a means for controlling refrigerant mass flow and for converting the refrigerant from the liquid state to a liquid/vapor state, and a means for passing the refrigerant in the liquid/vapor state through the moisture removing means to convert the refrigerant into a vapor state. In some embodiments, the means for controlling mass flow of the refrigerant comprises an expansion valve (e.g., a TEV) that is electronically controlled.

In some embodiments, the drying gas is not air. In some embodiments, the drying gas contains no oxygen. In some embodiments, the drying process is a continuous flow process. In some embodiments, the drying process is a semicontinuous batch flow process. In some embodiments, the product to be dried travels in a continuous flow process. In some embodiments, the product to be dried travels in a semicontinuous batch flow process.

In another example, a process drying apparatus comprises: (1) a chamber for containing product to be dried, (2) a means for supplying heated dry air other suitable drying gas at a first temperature to the chamber, and (3) a heat pump system. In some embodiments, the chamber containing product to be dried includes, but is not limited to, milk, whey, baking mixes, baby foods, grain, pharmaceuticals, metals, and the like. In some embodiments, the means for supplying heated dry air or other suitable drying gas at a first temperature to the chamber comprises a closed loop air flow pathway including a means for removing moisture from air exiting the chamber and for decreasing the temperature of the air to below dew point temperature, and further includes a means for increasing the temperature of the air exiting the moisture removing means to the first temperature. In some embodiments, the heat pump system comprises a means for passing a refrigerant in a vapor state through the temperature increasing means converting the refrigerant to a liquid state, a means for controlling refrigerant mass flow and for converting the refrigerant from the liquid state to a liquid/vapor state, and a means for passing the refrigerant in the liquid/vapor state through the moisture removing means to convert the refrigerant into a vapor state. In some embodiments, the apparatus further includes an air economizer positioned in the closed loop air flow pathway.

In some embodiments, the air economizer comprises a hot section positioned on an inlet side of the moisture removing means, and a cold section positioned on an outlet side of the moisture removing means. The air economizer cold section is positioned between the moisture removing means and the temperature increasing means. In some embodiments, the air economizer includes a thermal link between the hot and cold sections, wherein the cold section receives heat from the hot section via the thermal link. In some embodiments, the thermal link comprises a circulating thermal fluid loop between the hot section and the cold section. The thermal fluid can be circulated by a pump, and the pump speed can be controlled to vary the effectiveness of the air economizer. In some embodiments, the thermal link comprises one or more heat pipes between the hot section and the cold section. In some embodiments, the air economizer cold section is positioned between the moisture removing means and the temperature increasing means. In some embodiments, the air economizer comprises an air-to-air heat exchanger.

In some embodiments, the drying gas is not air. In some embodiments, the drying gas contains no oxygen. In some embodiments, the drying process is a continuous flow process. In some embodiments, the drying process is a semicontinuous batch flow process. In some embodiments, the product to be dried travels in a continuous flow process. In some embodiments, the product to be dried travels in a semicontinuous batch flow process.

In another example, a process drying apparatus comprises: (1) a chamber for containing product to be dried, (2) a means for supplying heated dry air other suitable drying gas at a first temperature to the chamber, and (3) a heat pump system. In some embodiments, the chamber containing product to be dried includes, but is not limited to, milk, whey, baking mixes, baby foods, grain, pharmaceuticals, metals, and the like. In some embodiments, the means for supplying heated dry air or other suitable drying gas at a first temperature to the chamber comprises a closed loop air flow pathway including a means for removing moisture from air exiting the chamber and for decreasing the temperature of the air to below dew point temperature, and further includes a means for increasing the temperature of the air exiting the moisture removing means to the first temperature. In some embodiments, the heat pump system comprises a means for passing a refrigerant in a vapor state through the temperature increasing means converting the refrigerant to a liquid state, a means for controlling refrigerant mass flow and for converting the refrigerant from the liquid state to a liquid/vapor state, and a means for passing the refrigerant in the liquid/vapor state through the moisture removing means to convert the refrigerant into a vapor state. In some embodiments, the heat pump system further includes a refrigerant economizer.

In some embodiments, the refrigerant economizer has a hot economizer section and a cold economizer section and means for transferring heat from the hot economizer section to the cold economizer section. The refrigerant economizer hot section and the refrigerant economizer cold section are each formed by a heat exchanger.

In another example, a process drying apparatus comprises: (1) a chamber for containing product to be dried, (2) a means for supplying heated dry air other suitable drying gas at a first temperature to the chamber, and (3) a heat pump system. In some embodiments, the chamber containing product to be dried includes, but is not limited to, milk, whey, baking mixes, baby foods, grain, pharmaceuticals, metals, and the like. In some embodiments, the means for supplying heated dry air or other suitable drying gas at a first temperature to the chamber comprises a closed loop air flow pathway including a means for removing moisture from air exiting the chamber and for decreasing the temperature of the air to below dew point temperature, and further includes a means for increasing the temperature of the air exiting the moisture removing means to the first temperature. In some embodiments, the heat pump system comprises a means for passing a refrigerant in a vapor state through the temperature increasing means converting the refrigerant to a liquid state, a means for controlling refrigerant mass flow and for converting the refrigerant from the liquid state to a liquid/vapor state, and a means for passing the refrigerant in the liquid/vapor state through the moisture removing means to convert the refrigerant into a vapor state. In some embodiments, the heat pump system further includes a compressor desuperheater for increasing refrigerant mass flow.

In some embodiments, the apparatus further includes a controller for starting and stopping the apparatus when desired. In some embodiments, the controller starts a blower first, and then starts the compressor when desired air flow rate is achieved. In some embodiments. The controller can be used for maintaining desired product dryness, and the blower speed, compressor speed, and refrigerant superheater effectiveness can be manually or automatically adjusted as needed, to control operating temperature, humidity, and said desired product dryness.

In another example, a process drying apparatus comprises: (1) a chamber for containing product to be dried, (2) a means for supplying heated dry air other suitable drying gas at a first temperature to the chamber, and (3) a heat pump system. In some embodiments, the chamber containing product to be dried includes, but is not limited to, milk, whey, baking mixes, baby foods, grain, pharmaceuticals, metals, and the like. In some embodiments, the means for supplying heated dry air or other suitable drying gas at a first temperature to the chamber comprises a closed loop air flow pathway including a means for removing moisture from air exiting the chamber and for decreasing the temperature of the air to below dew point temperature, and further includes a means for increasing the temperature of the air exiting the moisture removing means to the first temperature. In some embodiments, the heat pump system comprises a means for passing a refrigerant in a vapor state through the temperature increasing means converting the refrigerant to a liquid state, a means for controlling refrigerant mass flow and for converting the refrigerant from the liquid state to a liquid/vapor state, and a means for passing the refrigerant in the liquid/vapor state through the moisture removing means to convert the refrigerant into a vapor state. In some embodiments, the heat pump system further includes a heat removing means. The heat removing means can remove heat substantially equal to the compressor energy consumption.

In some embodiments, the heat removing means is air cooled. In some embodiments, the heat removing means is liquid cooled. In some embodiments, the heat removing means comprises an air cooled refrigerant subcooler. In some embodiments, the heat removing means comprises a liquid cooled refrigerant subcooler. In some embodiments, the outlet means comprises means for supplying heated air to at least one other object or process (e.g., an object or process external to the apparatus). In some embodiments, the outlet means comprises means for supplying heated water or thermal fluid to at least one other object or process.

In another example, a process drying apparatus comprises: (1) a chamber for containing product to be dried, (2) a means for supplying heated dry air other suitable drying gas at a first temperature to the chamber, and (3) a heat pump system. In some embodiments, the chamber containing product to be dried includes, but is not limited to, milk, whey, baking mixes, baby foods, grain, pharmaceuticals, metals, and the like. In some embodiments, the means for supplying heated dry air or other suitable drying gas at a first temperature to the chamber comprises a closed loop air flow pathway including a means for removing moisture from air exiting the chamber and for decreasing the temperature of the air to below dew point temperature, and further includes a means for increasing the temperature of the air exiting the moisture removing means to the first temperature. In some embodiments, the heat pump system comprises a means for passing a water-based refrigerant in a vapor state through the temperature increasing means converting the refrigerant to a liquid state, a means for controlling refrigerant mass flow and for converting the water based refrigerant from the liquid state to a liquid/vapor state, and a means for passing the refrigerant in the liquid/vapor state through the moisture removing means to convert the water based refrigerant into a vapor state. In some embodiments, the heat pump system operates at a pressure less than about 1 PSIA on a low side and less than about 10 PSIA on a high side.

In another example, a process drying apparatus comprises: (1) a chamber for containing product to be dried, (2) a means for supplying heated dry air other suitable drying gas at a first temperature to the chamber, and (3) a heat pump system. In some embodiments, the chamber containing product to be dried includes, but is not limited to, milk, whey, baking mixes, baby foods, grain, pharmaceuticals, metals, and the like. In some embodiments, the means for supplying heated dry air or other suitable drying gas at a first temperature to the chamber comprises a closed loop air flow pathway including a means for removing moisture from air exiting the chamber and for decreasing the temperature of the air to below dew point temperature, and further includes a means for increasing the temperature of the air exiting the moisture removing means to the first temperature. In some embodiments, the heat pump system comprises a means for passing a water-based refrigerant in a vapor state through the temperature increasing means converting the refrigerant to a liquid state, a means for controlling refrigerant mass flow and for converting the water based refrigerant from the liquid state to a liquid/vapor state, and a means for passing the refrigerant in the liquid/vapor state through the moisture removing means to convert the water based refrigerant into a vapor state. In some embodiments, the heat pump system further comprises a compressor of a rotary vane type capable of operating at a deep vacuum on a low side and at a high differential pressure. In some embodiments, the heat pump system has a compressor comprising regenerative blower stages. For example, the compressor can comprise a plurality of cascaded regenerative blower stages.

In some embodiments the heat pump system has an oilless compressor requiring no lubricant. In some embodiments, the heat pump system has a water soluble lubricant flowing through the refrigerant circuit. In some embodiments, the heat pump system includes piping formed from a non-corroding material, coating, or liner to prevent corrosion. In some embodiments, the water-soluble lubricant contains corrosion inhibitors.

In another example, a process drying apparatus comprises: (1) a chamber for containing product to be dried, (2) a means for supplying heated dry air other suitable drying gas at a first temperature to the chamber, and (3) a heat pump system. In some embodiments, the chamber containing product to be dried includes, but is not limited to, milk, whey, baking mixes, baby foods, grain, pharmaceuticals, metals, and the like. In some embodiments, the means for supplying heated dry air or other suitable drying gas at a first temperature to the chamber comprises a closed loop air flow pathway including a means for removing moisture from air exiting the chamber and for decreasing the temperature of the air to below dew point temperature, and further includes a means for increasing the temperature of the air exiting the moisture removing means to the first temperature. In some embodiments, the heat pump system comprises a means for passing a water-based refrigerant in a vapor state through the temperature increasing means converting the refrigerant to a liquid state, a means for controlling refrigerant mass flow and for converting the water based refrigerant from the liquid state to a liquid/vapor state, and a means for passing the refrigerant in the liquid/vapor state through the moisture removing means to convert the water based refrigerant into a vapor state. In some embodiments, the heat pump system further comprises piping and oxygen getter means installed in said piping. In some embodiments, the oxygen getter means comprises an ablative single use type. In some embodiments, the getter means has a media packaged in a sealed canister.

CONCLUSION

Heat pump closed loop process drying is substantially process agnostic. It may be applied to a wide variety of process drying applications in which the drying method is forced convection of a drying gas, such as spray drying as discussed herein, tunnel drying, tower drying, and others; for drying a wide variety of products including but not limited to milk, whey, baking mixes, baby foods, pharmaceuticals, grain, coffee, tea, and the like.

It is apparent that there has been provided in accordance with the present invention, a heat pump process dryer which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

I claim:

1. A closed loop drying system comprising:

a product drying chamber configured to dry a product and including:

an inlet configured to receive drying gas at a first temperature; and an outlet configured to output drying gas at a second temperature, wherein the first temperature is greater than the second temperature;

a gas drying chamber configured to receive the drying gas at the second temperature from the outlet of the product drying chamber and to provide the drying gas at the first temperature to the inlet of the product drying chamber; and a heat pump assembly coupled to the gas drying chamber including:

an evaporator configured to decrease a temperature of the drying gas at the second temperature received by the gas drying chamber to less than or equal to a dew point temperature corresponding to a third temperature, wherein the second temperature is greater than the third temperature; and a condenser configured to increase a temperature of the drying gas at less than or equal to the third temperature to the first temperature;

wherein the product drying chamber and the gas drying chamber are configured to form a closed loop.

2. The system of claim 1, wherein the gas drying chamber further includes:

a heat exchanger including:

a hot portion configured to decrease the temperature of drying gas in the gas drying chamber and to provide drying gas to the evaporator; and a cold portion configured to increase the temperature of drying gas in the gas drying chamber and to provide drying gas to the condenser.

3. The system of claim 1, wherein the first temperature of the drying gas is less than 200 degrees Fahrenheit.

4. The system of claim 3, wherein the first temperature of the drying gas is between about 160-180 degrees Fahrenheit.

5. The system of claim 1, wherein the drying gas enters the product drying chamber at the first temperature and at a first moisture content, and exits the product drying chamber at the second temperature and at a second moisture content, wherein the first moisture content is less than the second moisture content.

6. The system of claim 1, further comprising:

a heatsink including:

a hot portion configured to receive drying gas from the product drying chamber; and a cold portion configured to cool the drying gas received by the hot portion of the heatsink using ambient air, and to provide the drying gas to the gas drying chamber;

wherein the heatsink is configured to further form the closed loop with the product drying chamber and the gas drying chamber.

7. The system of claim 1, wherein (1) emissions to an environment of product entrained in the drying gas, and (2), emissions to the environment of hydrocarbon, fluorine, and chlorine from the heat pump assembly are reduced relative to conventional drying systems.

8. The system of claim 1, wherein the heat pump assembly further includes:

a heat exchanger configured to cool refrigerant exiting the condenser and to provide the refrigerant to the evaporator.

9. A system comprising:

a first chamber configured to dry a product and including:

an inlet configured to receive drying gas at a first temperature; and an outlet configured to output drying gas at a second temperature, wherein the first temperature is greater than the second temperature;

a second chamber configured to receive the drying gas at the second temperature from the outlet of the first chamber and to provide the drying gas at the first temperature to the inlet of the second chamber; and a heat pump assembly coupled to the second chamber including:

an evaporator configured to decrease a temperature of the drying gas at the second temperature received by the second chamber to less than or equal to a dew point temperature corresponding to a third temperature, wherein the second temperature is greater than the third temperature; and a condenser configured to increase a temperature of the drying gas at less than or equal to the third temperature to the first temperature;

wherein the first chamber and the second chamber are configured to form a closed loop.

10. The system of claim 9, wherein the second chamber further includes:

a heat exchanger including:

a first section configured to decrease the temperature of drying gas in the second chamber and to provide drying gas to the evaporator; and a second section configured to increase the temperature of drying gas in the second chamber and to provide drying gas to the condenser.

11. The system of claim 9, wherein the first temperature of the drying gas is less than 200 degrees Fahrenheit.

12. The system of claim 11, wherein the first temperature of the drying gas is between about 160-180 degrees Fahrenheit.

13. The system of claim 9, wherein the drying gas enters the first chamber at the first temperature and at a first moisture content, and exits the first chamber at the second temperature and at a second moisture content, wherein the first moisture content is less than the second moisture content.

14. The system of claim 9, further comprising:

a heatsink including:

a first section configured to receive drying gas from the first chamber; and a second section configured to cool the drying gas received by the first section of the heatsink using ambient air, and to provide the drying gas to the second chamber;

wherein the heatsink is configured to further form the closed loop with the first chamber and the second chamber.

15. The system of claim 9, wherein (1) emissions to the environment of product entrained in the drying gas, and (2), emissions to an environment of hydrocarbon, fluorine, and chlorine from the heat pump assembly are reduced relative to conventional open loop drying systems.

16. The system of claim 9, wherein the heat pump assembly further includes:

a heat exchanger configured to cool refrigerant exiting the condenser and to provide the refrigerant to the evaporator.

17. A method of drying a product using a closed loop system, the method comprising:

receiving, by a product drying chamber, a drying gas at a first temperature via an inlet configured to receive the drying gas at the first temperature;

applying the drying gas to the product; outputting, by the product drying chamber, the drying gas at a second temperature via an outlet configured to output the drying gas at the second temperature;

wherein the first temperature is greater than the second temperature;

receiving, by a gas drying chamber, the drying gas at the second temperature;

providing, by the gas drying chamber, the drying gas at the second temperature to a heat pump assembly that is coupled to the gas drying chamber and includes an evaporator and a condenser;

decreasing, by the evaporator of the heat pump assembly, a temperature of the drying gas at the second temperature received by the gas drying chamber to less than or equal to a dew point temperature corresponding to a third temperature, wherein the second temperature is greater than the third temperature;

cooling, by the evaporator of the heat pump assembly, the drying gas from the second temperature to less than or equal to the dew point temperature corresponding to the third temperature;

increasing, by the condenser of the heat pump assembly, a temperature of the drying gas at less than the third temperature to the first temperature; and heating, by the condenser of the heat pump assembly, the drying gas from less than the third temperature to the first temperature;

wherein the product drying chamber and the gas drying chamber are configured to form a closed loop.

18. The method of claim 17, further comprising:

decreasing, by a hot portion of a heat exchanger, the temperature of the drying gas in the gas drying chamber;

providing, by the hot portion of the heat exchanger, the drying gas to the evaporator;

increasing, by a cold portion of the heat exchanger, the temperature of the drying gas in the gas chamber; and providing, by the cold portion of the heat exchanger, the drying gas to the condenser.

19. The method of claim 17, further comprising:

receiving, by a hot portion of a heatsink, the drying gas from the product drying chamber;

decreasing, by a cold portion of the heatsink, the temperature of the drying gas received by the hot portion of the heatsink using ambient air; and providing the drying gas from the heatsink to the gas drying chamber; wherein the heatsink is configured to further form the closed loop with a first chamber and a second chamber.

20. The method of claim 17, further comprising:

cooling, by a heat exchanger, refrigerant exiting the condenser; and providing the refrigerant to the evaporator.

* * * * *